(12) United States Patent
Kugeman et al.

(10) Patent No.: US 7,917,434 B2
(45) Date of Patent: Mar. 29, 2011

(54) METHOD FOR PLANNING COMMERCIAL FINANCING PAYMENT

(75) Inventors: William Patrick Kugeman, Fairfield, CT (US); Anthony James Mariano, Lake in the Hills, IL (US); Kevin Gerard McGuirk, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 3285 days.

(21) Appl. No.: 10/218,653

(22) Filed: Aug. 13, 2002

(65) Prior Publication Data
US 2004/0034595 A1 Feb. 19, 2004

(51) Int. Cl.
*G06Q 40/00* (2006.01)
(52) U.S. Cl. ............................................... 705/40
(58) Field of Classification Search .................. 705/40
See application file for complete search history.

(56) References Cited

U.S. PATENT DOCUMENTS

| 5,465,206 | A | | 11/1995 | Hilt et al. | ............... 354/406 |
| 5,671,280 | A | * | 9/1997 | Rosen | ............... 705/67 |

(Continued)

FOREIGN PATENT DOCUMENTS

| CA | 2300023 | 8/2001 |
| JP | 08339465 A | 12/1996 |

(Continued)

OTHER PUBLICATIONS

The Quarterly Journal of Economics, vol. 73, No. 4 (Nov. 1959), pp. 619-632 , Published by: The MIT Press.*

(Continued)

*Primary Examiner* — Alexander Kalinowski
*Assistant Examiner* — Chuks Onyezia
(74) *Attorney, Agent, or Firm* — Cahn and Samuels LLP

(57) ABSTRACT

A commercial financing payment planning system and associated method provide commercial financing customers the ability to retrieve and monitor account activity, track scheduled payment dates, and create/submit remittance instructions online. The system provides numerous functions to a customer, such as customer payment control, access to multiple payment sources by the customer, automatic funds transfer, customized user access, a customer dispute process for disputing supplier invoices, automatic dispute response, and credit tracking. With payment control, the customer specifies which and on what date the invoices will be paid, and the source of funds for the payments. The customer can make these payments from one or a combination of sources. By creating a remittance advice document, the customer can specify in advance payment details and give authorization for automatic payment by the system. The customer can also customize access to control features of the system of the invention for each of the customer's accounts/receivable employees. In the event that the customer has an issue with a supplier's delivery, product, or pricing, the customer can submit a dispute to a supplier. The customer, supplier, and finance company can view a payment dispute and dispute status through the entire dispute process. The system automatically e-mails the customer a response when the dispute is resolved, informing the customer of the result of the resolution. Both the finance company and the customer can track credits applied to the customer's account through the entire dispute process.

5 Claims, 41 Drawing Sheets

U.S. PATENT DOCUMENTS

| | | | |
|---|---|---|---|
| 5,832,460 A | 11/1998 | Bednar et al. | 705/27 |
| 5,920,847 A | 7/1999 | Kolling et al. | 705/40 |
| 6,070,150 A | 5/2000 | Remington et al. | 705/34 |
| 6,081,790 A | 6/2000 | Rosen | 705/40 |
| 6,144,726 A * | 11/2000 | Cross | 379/114.03 |
| 6,223,168 B1 | 4/2001 | McGurl et al. | 705/40 |

FOREIGN PATENT DOCUMENTS

| | | |
|---|---|---|
| JP | 2000-011228 A | 1/2000 |
| JP | 2000-92913 A | 4/2001 |
| WO | WO 01/69495 A1 | 9/2001 |

OTHER PUBLICATIONS

The American Economic Review, vol. 76, No. 2, Papers and Proceedings of the Ninety-Eighth Annual Meeting of the American, Economic Association (May 1986), pp. 323-329.*

Sharman et al., "Self Service Document Processing for Banking Automation," IEEE Colloquium on Document Image Processing and Multimedia Environments, Digest No. 1995/191, 1995.

* cited by examiner

270

Account summary

Due date detail

Account: 123456789

| Due date ▼ | PO no ▼ | Supplier ▼ | Invoice no ▼ | Invoice date ▼ | Balance (DKK) ▼ — 275 |
|---|---|---|---|---|---|
| 09/09/2001 | | LOTUSSAP | 15000577 | 27/06/2001 | 2,797,587.00 |
| 09/09/2001 | | LOTUSSAP | 15000578 | 27/06/2001 | 3,842,660.90 |

○ Print — 280      ○ Download — 285

Account management tool
Remarketer

- Account summary
- Create remittance
- Existing remittances
- Billing invoice
- Invoice inquiry
- Payments processed
- Returned payments
- Unallocated funds User preference
Help
Feedback
Sign out

Billing invoice

Summary

Account 1234/6789

| Invoice date | Invoice no. | Amount (DKK) |
|---|---|---|
| 30/04/2002 | 5432/213 | 691.310,74 |
| 31/05/2002 | 6544/261 | 111.203,37 ← 330 |

⊙ Print    ⊙ Download

Account management tool
Remarketer

- Account summary
- Create remittance
- Existing remittances
- Billing invoice
- Invoice inquiry
- Payments processed
- Returned payments
- Unallocated funds
- User preference
- Help
- Feedback
- Sign out

Billing invoice

Detail

Account

| | |
|---|---|
| Invoice number | BNY 1219 |
| Billing type | 3 Invoice |
| Invoice date | 30/04/2002 |
| Invoice posting period | 2002 04 |
| Invoice due date | 14/06/2002 |
| Outstanding balance | 691.310,74 |
| Status | Outstanding |
| Paid amount | 691.310,74 |
| Date paid | |

| | Charges (DKK) | Tax (DKK) | Total (DKK) |
|---|---|---|---|
| Loan interest/charges | 691.310,74 | 0,00 | 691.310,74 |
| Late payment int/charges | 0,00 | 0,00 | 0,00 |
| Unallocated funds/charges | 0,00 | 0 | 0,00 |
| Total | 691.310,74 | 0,00 | 691.310,74 |

Account management tool

Remarketer
- Account summary
- Create remittance
- Existing remittances
- Billing invoice
- Invoice inquiry
- Payments processed
- Returned payments
- Unallocated funds User preference
Help
Feedback
Sign out

Unallocated funds

Summary

Account: 123456789
Total (DKK): 902,038.49

| Account management tool | UFA entity type | Reference | Posting date | Outstanding value (DKK) |
|---|---|---|---|---|
| Remarketer | | | | |
| Account summary | UNALLOCATED FUNDS ACCOUNT | | 30/08/2001 | 67,524.11 |
| Create remittance | UNALLOCATED FUNDS ACCOUNT | | 22/03/2002 | 687,960.00 |
| Existing remittances | UNALLOCATED FUNDS ACCOUNT | | 25/03/2002 | 63,694.83 ← 410 |
| Billing invoice | UNALLOCATED FUNDS ACCOUNT | | 25/03/2002 | 3,827.55 |
| Invoice inquiry | UNALLOCATED FUNDS ACCOUNT | | 25/03/2002 | 21,787.50 |
| Payments processed | UNALLOCATED FUNDS ACCOUNT | | 25/03/2002 | 6,999.40 |
| Returned payments | UNALLOCATED FUNDS ACCOUNT | | 25/03/2002 | 35,992.63 |
| Unallocated funds | UNALLOCATED FUNDS ACCOUNT | | 25/03/2002 | 2,233.33 |
| User preference | | | | |
| Help | | | | |
| Feedback | | | | |
| Sign out | | | | |

FIG. 13

Account management tool

Remarketer
- Account summary
- Existing remittances
- Billing invoice
- Invoice inquiry
- Payments processed
- Returned payments
- Unallocated funds
- Disputes

User preference
- Help
- Feedback
- Sign out

Account summary

Due date

Account

Select one or more and click continue button.

| Select | Due date | Amount due (DKK) |
|---|---|---|
| ☐ | 05/05/2001 | 0,00 |
| ☐ | 06/09/2001 | 0,00 |
| ☐ | 09/09/2001 | 6,630,237.90 |
| ☐ | 10/09/2001 | 267,100.93 |
| ☐ | 25/09/2001 | 96,586.50 |
| ☐ | 14/11/2001 | 195,340.78 |
| ☐ | 06/12/2001 | 79,654.06 |
| ☐ | 11/1/2001 | 1,208.87 |
| ☐ | 19/02/2002 | 93,092.21 |

[Continue] 485    [Cancel]

Create remittance

Billing invoice

Account

| Pay Due date ▼ | PO no ▼ | Supplier ▼ | Inv no ▼ | Inv date ▼ | Balance (EUR) ▼ | Payment amount (EUR) ▼ |
|---|---|---|---|---|---|---|
| ☐ 21/08/2002 | | 99 | 02SM1142 | 24/05/2002 | 2,708,04 | 2,708,04 |
| ☐ 21/08/2002 | | 99 | 02SM1143 | 24/05/2002 | 87,866,77 | 87,866,77 |
| ☐ 21/08/2002 | | 99 | 02SM1144 | 24/05/2002 | 50,894,74 | 50,894,74 |
| ☐ 21/08/2002 | | 99 | 02SM1145 | 24/05/2002 | 48,479,44 | 48,479,44 |
| ☐ 21/08/2002 | | 99 | 02SV2588 | 24/05/2002 | 11,415,49 | 11,415,49 |

Account management tool
Remarketer
- Account summary
- Create remittance
- Existing remittances
- Billing invoice
- Invoice inquiry
- Payments processed
- Returned payments
- Unallocated funds
- Disputes User preference
Help
Feedback
Sign out Save · Select all · Deselect all · Cancel

Disputes

600

| Account management tool | |
|---|---|
| Remarketer | |
| Account summary | |
| Create remittance | |
| Existing remittances | Create a new dispute on an open invoice 605 |
| Billing invoice | Go here to search the account management tool for open invoices and create disputes against them. |
| Invoice inquiry | |
| Payments processed | Create a new dispute on a paid invoice 865 |
| Returned payments | Go here to create a dispute on an invoice that has already been paid. |
| Unallocated funds | |
| Disputes | Create a re-dispute |
| Help | Go here to list all invalid, partial or rejected disputes and re-open the issue (New information should be provided). |
| Feedback | |
| Logoff | Edit a saved dispute |
| | Go here to list all the saved but not submitted disputes to complete the missing information and submit them for research. |
| | |
| | Download dispute |
| | Go here to download your open dispute request(s). |
| | |
| | Search Disputes |
| | Go here to search the dispute database for all items that have not yet been closed fully. |

Create a redispute

Search

Search disputes

Account management tool
- Remarketer
- Account summary
- Create remittance
- Existing remittances
- Billing invoice
- Invoice inquiry
- Payments processed
- Returned payments
- Unallocated funds
- Disputes Help
Feedback
Logoff Account
Supplier  — Financier status ▼
Financier status  DLR-1000 SP Pvt Ltd
Dispute number
PO no.
Credit — Credit ▼
Dispute type — Dispute type ▼
Sort by — Sort by ▼

Submit  ⊗ Clear

Account summary 910

Account management tool
Supplier
- Account summary
- Remittance settled
- Remittance scheduled
- Invoice/Credit note file
- Invoice Inquiry
- Disputes
- User profile
- Standard response
- User preference
- Help
- Feedback
- Sign out Welcome, [...]

Account: IBM

| Address | |
|---|---|
| IBM France Financement | Opening balance as of |
| Tour Descartes | 23/07/2002 |

| Description | Currency processed (EUR) |
|---|---|
| Remittance settled | 500 — 915 |
| Remittance scheduled | 1,000.00 — 925 |
| Invoice credit note file | 1010 — 945 |

Remittance Scheduled Detail

Account:IBM

Remittance Date:02-09-2002

| Cust. Number | Inv/Crn number | Inv/Crn date | Amount Scheduled (USD) |
|---|---|---|---|
| SEG-DLR-CO | SECRETKEY | 14-02-2002 | 1,000.00 |

Print | Download

Account management tool
Supplier
Account summary
Remittance settled
Remittance scheduled
Invoice/Credit note file
Invoice inquiry
Disputes
User profile
Standard response
Help
Feedback
Sign out

FIG. 34

Invoice Credit Note File Detail

960

Account management tool
Supplier
Account summary
Remittance sealed
Remittance scheduled
Invoice/Credit note file
Invoice inquiry
Disputes
User profile
Standard response
Help
Feedback
Sign out Account: IBM
Sequence number: 1234
Date: 2001-12-00
Total: $1010

| Chq. date | Chq. number or resource | Invoice number | Amount |
|---|---|---|---|
| 2001-12-00 | | 54789 | 1010 |

Supplier tracking
Report

Account:

| Dispute no. | Invoice no. | IRFS log no. | Create date | Amount(USD) |
|---|---|---|---|---|
| 121 | INV100 | 0 | 04-04-2002 | 1,000.00 |
| 122 | INV100 | 0 | 04-04-2002 | 10,000.00 |
| 123 | INV100 | 0 | 04-04-2002 | 100.00 |
| 124 | INV100 | 0 | 04-04-2002 | 100.00 |
| 128 | INV100 | 0 | 04-04-2002 | 123,123.00 |
| 129 | INV100 | 0 | 04-04-2002 | 123,123.00 |
| 130 | INV100 | 0 | 04-04-2002 | 123,123.00 |
| 131 | INV100 | 0 | 04-04-2002 | 1,314.00 |
| 132 | INV100 | 0 | 04-04-2002 | 4,343.00 |
| 133 | INV100 | 0 | 05-04-2002 | 34,213.00 |
| 134 | INV100 | 0 | 05-04-2002 | 25,235.00 |
| 135 | INV100 | 0 | 05-04-2002 | 252.00 |
| 136 | INV100 | 0 | 05-04-2002 | 100.00 |
| 137 | INV100 | 0 | 05-04-2002 | 43,245.00 |
| 138 | INV100 | 0 | 10-04-2002 | 12,345.00 |
| 141 | INV100 | 0 | 11-04-2002 | 75,000.00 |
| 142 | INV100 | 0 | 11-04-2002 | 123.00 |

METHOD FOR PLANNING COMMERCIAL FINANCING PAYMENT

FIELD OF THE INVENTION

The present invention generally relates to the field of commercial financing, and particularly to a software system and associated method for use with Internet Web pages to effect the transfer of funds from a customer to a supplier by means of accounts and remittance documents. More specifically, this invention pertains to an e-business method for enabling a customer to identify the funds to be transferred to a finance company at a specific date. In addition, the present invention further pertains to a method for allowing the customer, supplier, and finance company to track and manage the interactions between the customer and supplier.

BACKGROUND OF THE INVENTION

Businesses commonly rely on commercial financial companies to finance the purchase of products. Generally, customers are allowed 30 days of free financing by the finance company, with payments due on a specified day of the month, i.e., "commonized due date." The conventional payment structure is referred to as scheduled payment plan, or SPP. The advantages of the scheduled payment plan for commercial customers are coordination and forecasting of all their payments. Customer save in administration costs when using the scheduled payment plan because they are making only fewer payments per month, as opposed to writing checks every day for every invoice received.

The disadvantages to the business customer are inherent in the nature of the scheduled payment plan. Since the customer's statement from the finance company typically arrives only once a month, the customers may not be aware of payments due for products they have ordered until they receive monthly statements from the finance company. As a result, the customer may not receive invoice information in time to pay the product invoice before its due date, consequently incurring late fees and interest charges. In the event the customer wishes to dispute an invoice, no easy or timely mechanism exists within the standard finance company construct for resolving the dispute.

The standard scheduled payment plan approach also has disadvantages for the finance company. For customers dealing in large numbers of products, the entry of customer invoices and monitoring of payments becomes labor intensive and thus expensive. Additional labor is required for mailing out invoices. The application of cash payments to accounts is also labor intensive and error prone since payments are manually posted to accounts.

For both the customer and the finance company, the ability to manage funds and move payments quickly is critical when dealing with large amounts of money. The standard finance company approach mails invoices to business customers and receives payments through the mail. This approach is slow and relatively inefficient, limiting the ability of the finance company and the business customer to manage their accounts on a timely basis.

Some finance companies address these deficiencies in the scheduled payment plan by providing account information on the Internet. Customers can access their accounts at the finance company's Web site and monitor debits and credits to their accounts. However, this approach still requires payment by mail, which is manually processed when it arrives at the finance company. In addition, the finance company decides when and which of the customer's invoices will be paid. For many customers, the current approach to company finance does not allow the flexibility required to maximize the use of the company's resources and funding.

What is needed is a finance company model or system that allows the business customer to select which invoices from a supplier to pay, defer, or not pay, which invoices to partially pay, and which invoices to finance fully or partially over time. In addition, the business customer needs to be able to select a method of payment such as cash, wire transfer, or credit. In addition, a system is needed that allows both the supplier and business customer a convenient and timely method for disputing invoices and payments. The need for such a system has heretofore remained unsatisfied.

SUMMARY OF THE INVENTION

The system and method of the present invention for planning commercial financing payments satisfies this need. The system and associated method provide commercial financing customers, such as remarketers, the ability to retrieve and monitor account activities, to track scheduled payment dates, to create and/or submit remittance instructions or advice online, and receive discount based on early payment terms, if available. In a preferred embodiment, the commercial financing planning system is an e-business tool that gives financing customers control of their own accounts.

The system and method for planning commercial financing payments, are also referred to herein as the "payment planner" system and method, and offer several features, among which are the following:

(1) Payment control: The customer specifies which invoices to be paid, on what date the invoices will be paid, and the source of funds for the payments.

(2) Multiple payment sources: The customer can make payments with checks, debits, direct payment, credits, and/or other payment methods.

(3) Automatic funds transfer: Using a remittance advice document, the customer can specify in advance payment details and give authorization for automatic payment.

(4) Custom user access: The customer can customize access to control features of the payment planner system for each of the customer's accounts/receivable employees.

(5) Dispute process: The customer can submit a dispute to a supplier. The customer, supplier, and finance company can view and monitor a payment dispute and dispute status through the entire dispute process.

(6) Dispute response: The payment planner system automatically e-mails the customer a response when the dispute is resolved, informing the customer of the result of the resolution, including supplier comments.

(7) Credit tracking: Finance companies and customers can explicitly track credits applied to a specific customer's account through the dispute process.

Payment control by the customers allows the customers to notify the finance companies which individual invoices the customers plan to pay, how much they wish to pay, the payment methods, and the dates that the payments will be made. The payment planner system moves funds and applies the remittance instructions automatically, as instructed by the customer. Consequently, customers of the commercial finance company payment are afforded flexibility and reduced administrative costs, while the finance company is able to apply funds electronically to an account/receivable system, thereby reducing data entry errors and improving productivity.

The business customer can make payments using multiple sources such as checks, debits, direct payment, and credits.

The finance company can also issue credit to a customer in the form of a loan, line of credit, or credit based on account adjustments. The customers can apply this credit either to their outstanding balance or to one or more specific invoices. One aspect of the payment planner system is the customer's ability to apply credit to prior purchases as well as to future purchases, compared to a conventional finance company that allows customers to apply credits only to future purchases.

As instructed by the customer, the finance company transfers payments automatically. This payment or remittance is created by the payment planner system and displayed to the customer, listing the outstanding invoices cleared by direct debit. This feature eliminates the need to request fund transfers as required by conventional finance companies.

The payment planner system allows the customer to customize the level of access each accounts receivable manager has to payment features in the customer's account. Each manager or system user has an "entitlement" level set by the customer. When the user logs onto the payment planner system, features are enabled or disabled based on the access level of the user. For example, a user may have authorization only to create a remittance, requiring final review by an account manager, before the remittance can actually be processed by the finance company on behalf of the business customer.

The dispute process provided by the payment planner system also allows customers to dispute invoices, and allows suppliers to respond to those disputes. Any party can submit a dispute on a paid or unpaid invoice and record the reason for the dispute. The customer, supplier, and finance company can simultaneously monitor the progress of the dispute resolution, allowing quick resolution of the dispute.

When the dispute is resolved, the payment planner system automatically sends an e-mail to the customer informing the latter of the dispute resolution along with comments from the supplier. The payment planner system allows the finance company to suspend interest charged to the customer's account until the dispute is resolved and then charge the interest either to the supplier if the bill was in error, or to the customer if the bill was correct. Any credits applied to the customer's account as a result of the dispute can be viewed and tracked by the customer, supplier, and finance company.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 7 is a screen showing a summary of supplier invoices billed to the customer for one scheduled payment;

FIG. 9 is the billing invoice summary screen displaying a high-level overview of billing invoices;

FIG. 10 displays a billing invoice detail screen;

FIG. 13 is the unallocated funds summary screen showing a high-level overview of unallocated funds;

FIG. 17 shows the summary screen of invoices from suppliers, listed by due date;

FIG. 18 is the invoice summary screen listing individual invoices from suppliers for which the user can create a remittance;

FIG. 19 is the create remittance screen showing the total payment due after the user has selected a set of invoices to pay;

FIG. 20 shows the high-level summary screen for creating and managing disputes by a customer against a supplier;

FIG. 23 illustrates a dispute document created for an open invoice;

FIG. 24 illustrates a dispute document for a paid invoice requiring entry by the customer to submit to the supplier;

FIG. 29 shows the search screen used by the customer to locate a dispute for which the customer wishes to create a redispute;

FIG. 30 displays the supplier profile created by the supplier for defining allowable disputes and dispute terms;

FIG. 31 is the supplier account summary screen;

FIG. 33 displays a listing of the remittances scheduled for payment to the supplier;

FIG. 34 shows the remittance scheduled detail screen;

FIG. 36 shows the invoice credit note file detail; and

FIG. 37 is a listing of outstanding supplier invoices sorted by the dated on which they are created.

DETAILED DESCRIPTION OF PREFERRED EMBODIMENTS

The following definitions and explanations provide background information pertaining to the technical field of the present invention, and are intended to facilitate the understanding of the present invention without limiting its scope:

Internet: A collection of interconnected public and private computer networks that are linked together with routers by a set of stand protocols to form a global distributed network.

Web Site: A database or other collection of inter-linked hypertext documents ("Web documents" or "Web pages") and associated data entities, which is accessible via a computer network, and which forms part of a larger, distributed informational system such as the World Wide Web (WWW). In general, a Web site corresponds to a particular Internet domain name, and includes the content of a particular organization. Other types of Web sites may include, for example, a hypertext database of a corporate "Intranet" (i.e., an internal network which uses standard Internet protocols), or a site of a hypertext system that uses document retrieval protocols other than those of the WWW.

World Wide Web (WWW): An Internet user—server hypertext distributed information retrieval system.

Figure 1:
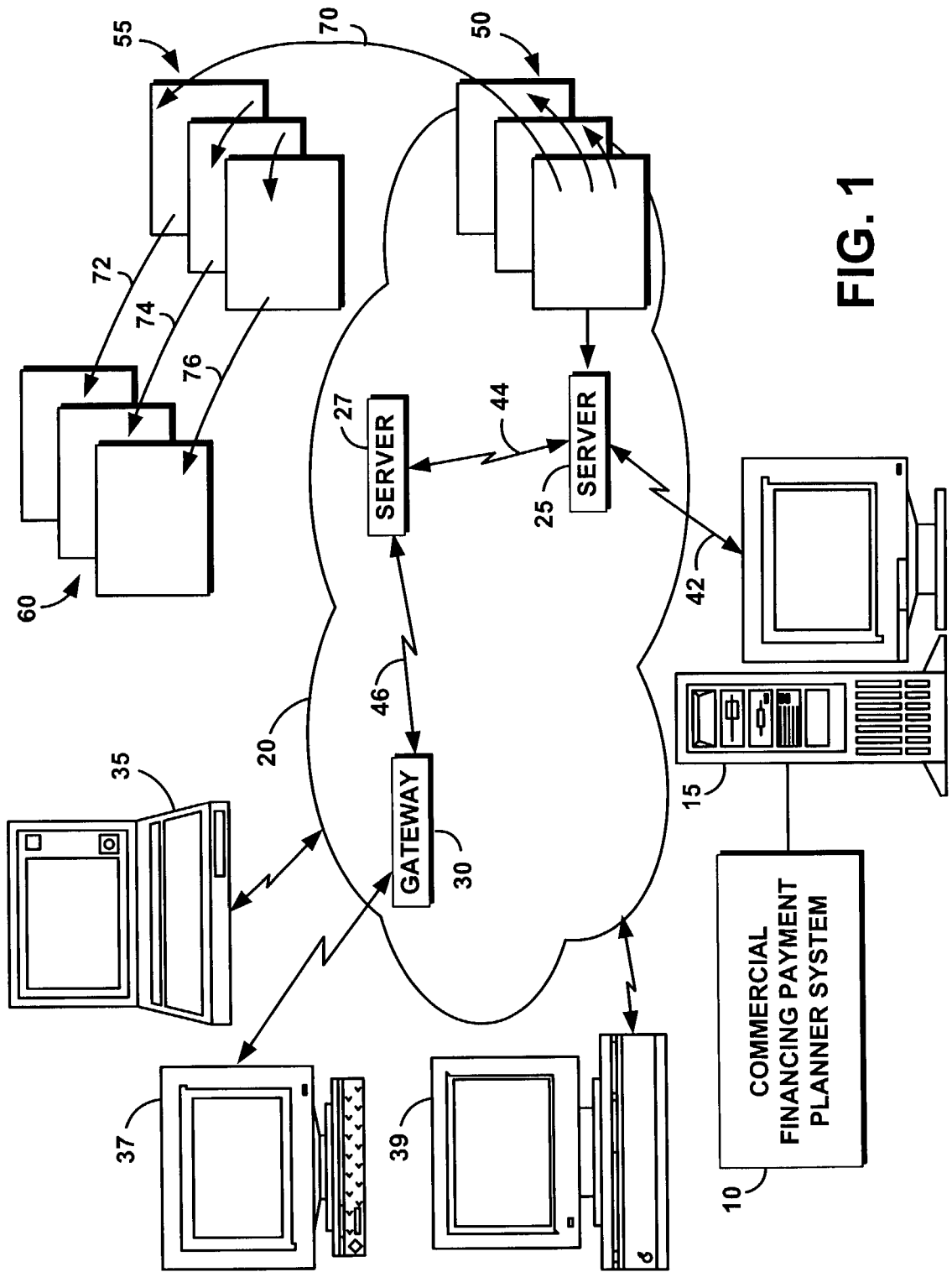
FIG. 1 is a schematic illustration of an exemplary operating environment in which a commercial financing payment planner system and associated method of the present invention can be used.

FIG. 1 portrays an overall environment in which a payment planner system (or account management tool) 10 and associated method according to the present invention may be used. The payment planner system 10 includes a software or computer program product that is typically embedded within, or installed on a host server 15. Alternatively, the payment planner system 10 can be saved on a suitable storage medium such as a diskette, a CD, a hard drive, or like devices. While the payment planner system 10 will be described in connection with the WWW, it can be used with a stand-alone database of terms that may have been derived from the WWW and/or other sources.

The cloud-like communication network 20 is comprised of communication lines and switches connecting servers such as servers 25, 27, to gateways, such as gateway 30. The servers 25, 27 and the gateway 30 provide the communication access to the WWW Internet. Users, such as remote Internet users, are represented by a variety of computers such as computers 35, 37, 39, and can query the host server 15 for desired information through the communication network 20.

The host server 15 is connected to the network 20 via a communications link 42 such as a telephone, cable, or satellite link. The servers 25, 27 can be connected via high-speed Internet network lines 44, 46 to other computers and gateways. The servers 25, 27 provide access to stored information such as hypertext or Web documents indicated generally at 50, 55, and 60. The hypertext documents 50, 55, 60 most likely include embedded hypertext link to other locally stored pages, and hypertext links 70, 72, 74, 76 to other webs sites or documents 55, 60 that are stored by various Web servers such as the server 27.

Figure 2A:
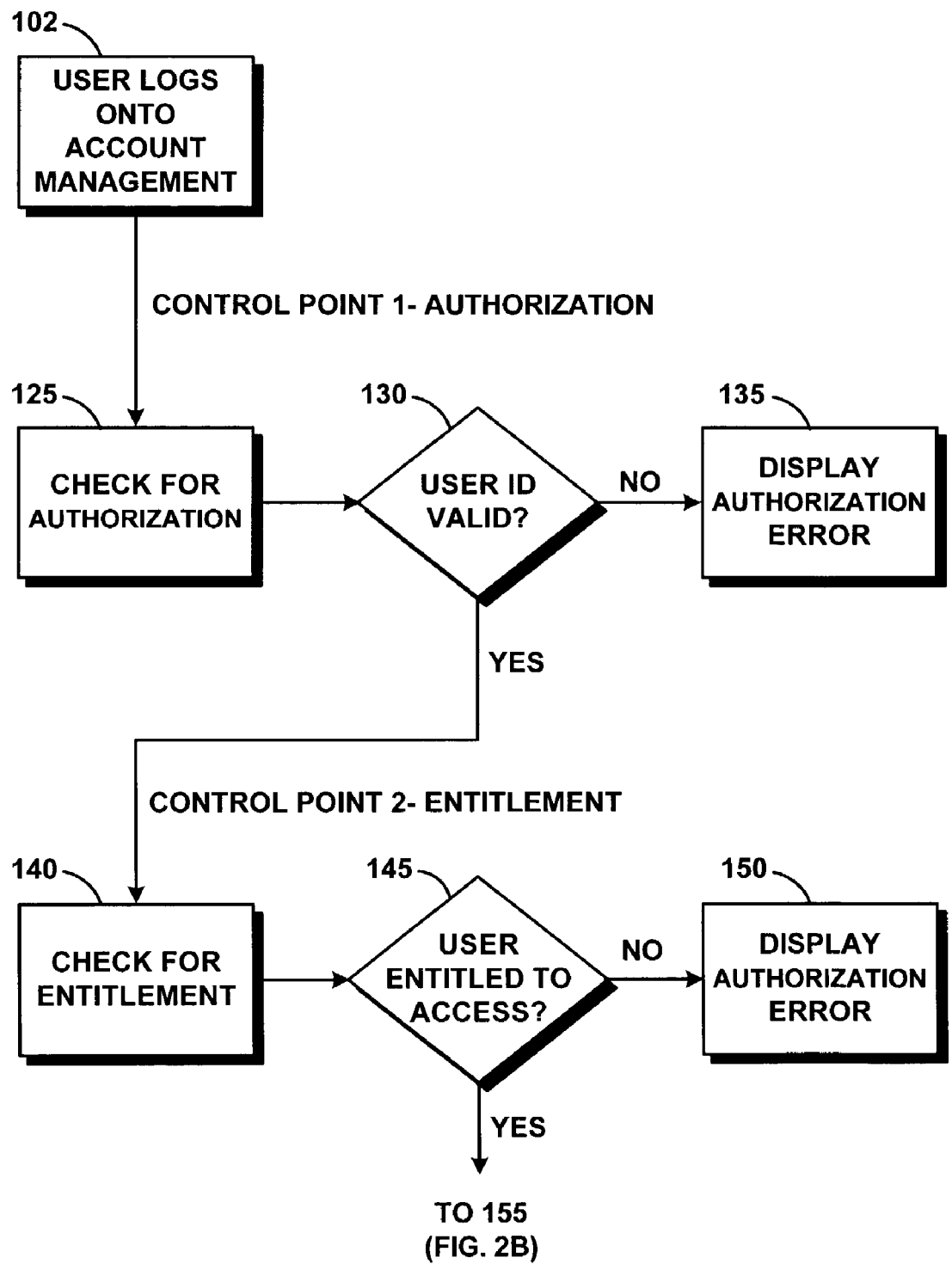
FIG. 2 is comprised of FIGS. 2A and 2B, and represents a flow chart illustrating the log-in feature of the payment planner system of FIG. 1 when accessed by a customer.
Figure 2B:
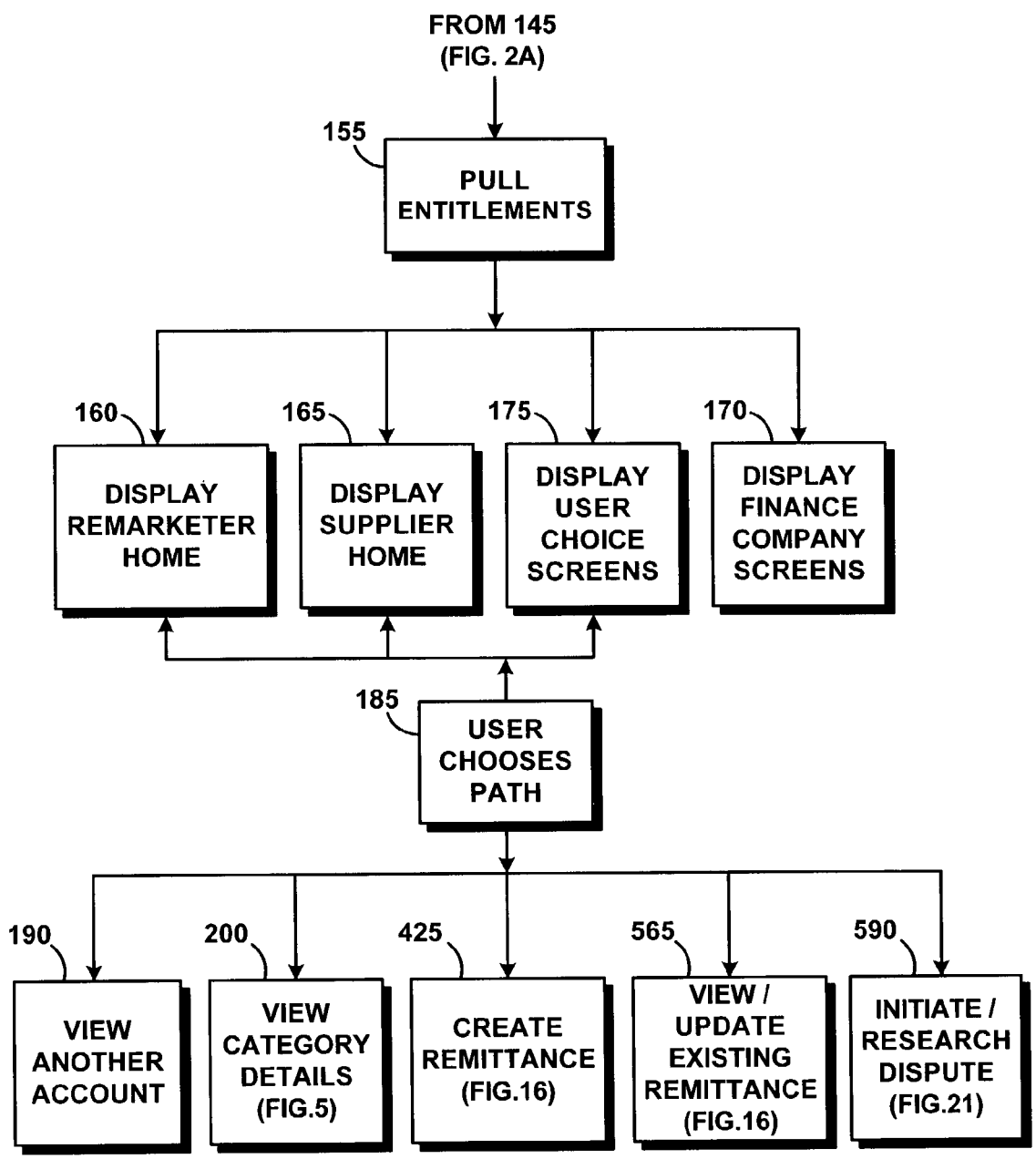
Figure 3:
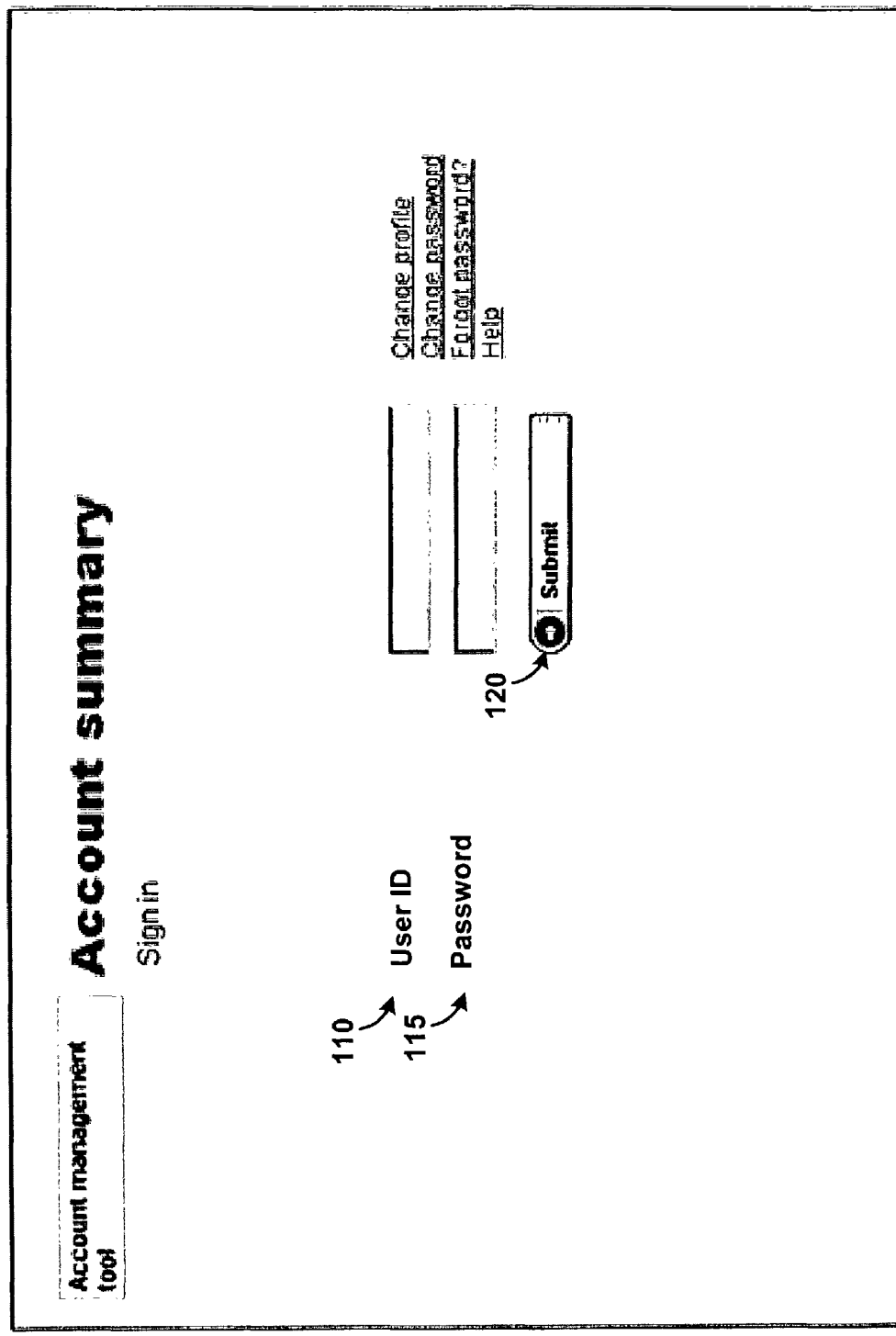
FIG. 3 shows an exemplary log-in screen for a customer wishing to access the payment planner system of FIG. 1.

In operation, and with further reference to the operational method 100 of FIG. 2, the user accesses system 10 in step 102 through a log in screen 105 illustrated in FIG. 3. The user enters his or her ID or identification (userid) 110 and password 115, then clicks a sign-in button 120. In step 125 of FIG. 2, system 10 verifies the validity of the user ID 110 and password 115.

If at decision step 130 the user ID 110 and password 115 are deemed to be invalid, system 10 displays an authorization error in step 135. Otherwise, system 10 checks in step 140 the user's allowed level of access to program features, referred to as "entitlement." For example, a user may be able to submit requests for payment of invoices, but not actually authorize the payment. Payment authorization would then be made by a higher-level manager. Each screen presented to the user by system 10 displays only those functions the user may access.

If the user is not entitled to use the account management tool of system 10 at decision point 145, system 10 displays an authorization error in step 150. Otherwise, system 10 determines the user's level of entitlement in step 155 and displays the appropriate "home" screen to the user, such as for a business customer 160. The "home" screen is the top-level screen that displays a summary of the functions available to the user. Different functions are available to the user based on the user's relation to the finance company. The business customer 160, supplier 165, and finance company 170 user will each see different home screens. In addition, the user may customize his or her home screen as indicated by user choice screen 175.

Figure 4:
FIG. 4 represents the customer's home screen for account management on the payment planner system of FIG. 1.

FIG. 4 shows a typical home screen 180 for a business customer or remarketer 160 (FIG. 2). Once the user accesses the home screen 180, he or she may choose a variety of paths in step 185 (FIG. 2). A business customer may have several accounts with the finance company, especially if the business customer is an international company. The user may change accounts in step 190 by selecting the pull-down menu 195 on the account summary screen 180. The user may view category details (step 200) for the displayed account by clicking on one of the categories in the category listing 205 such as invoice summary 210, billing invoice summary 215, returned payments 220, or unallocated funds 225 (FIG. 4).

Figure 5A:
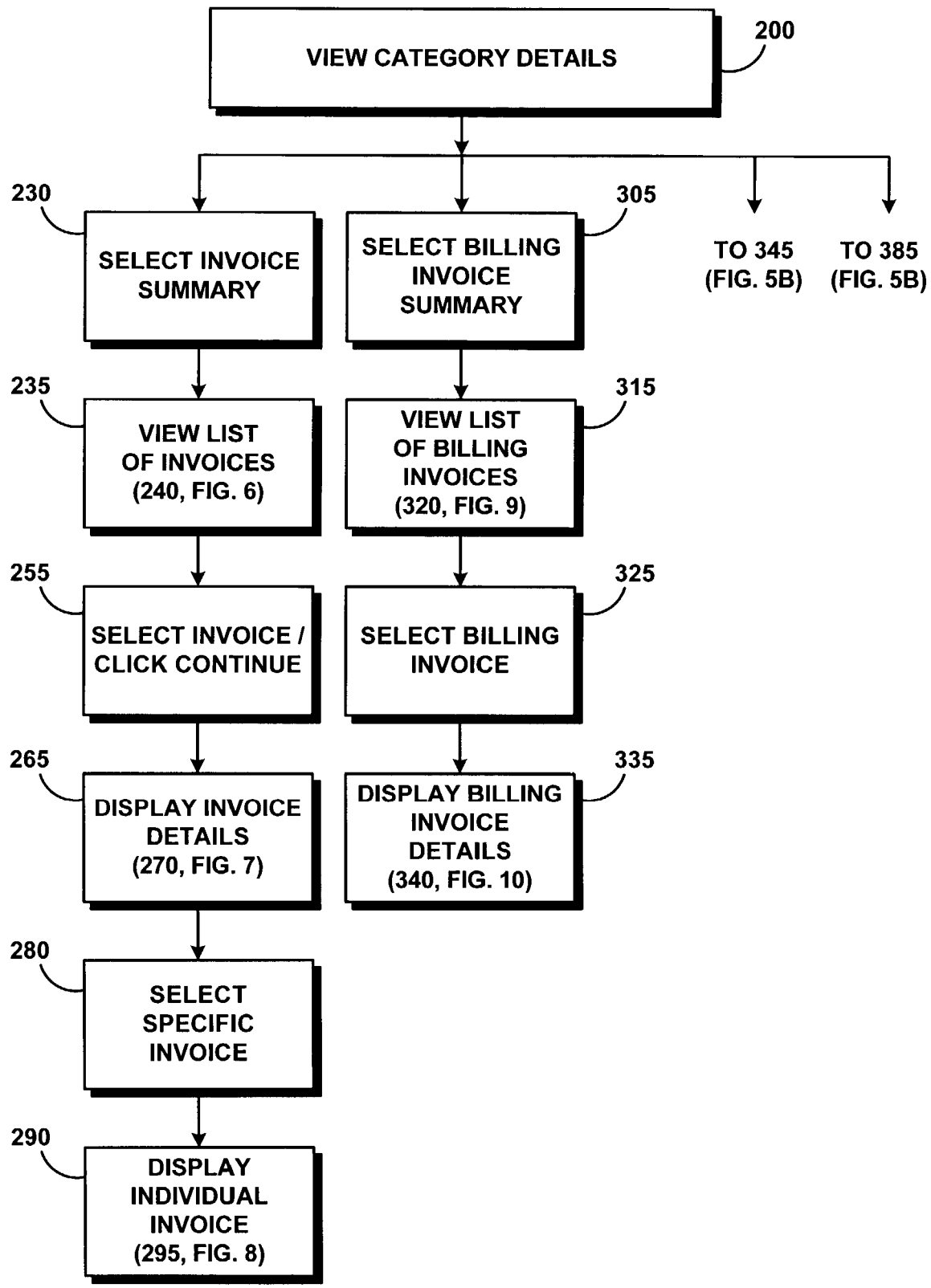
FIG. 5 is comprised of FIGS. 5A and 5B, and illustrates the logic flow of the system of FIG. 1 as the user accesses different features on the home screen of FIG. 4.
Figure 5B:
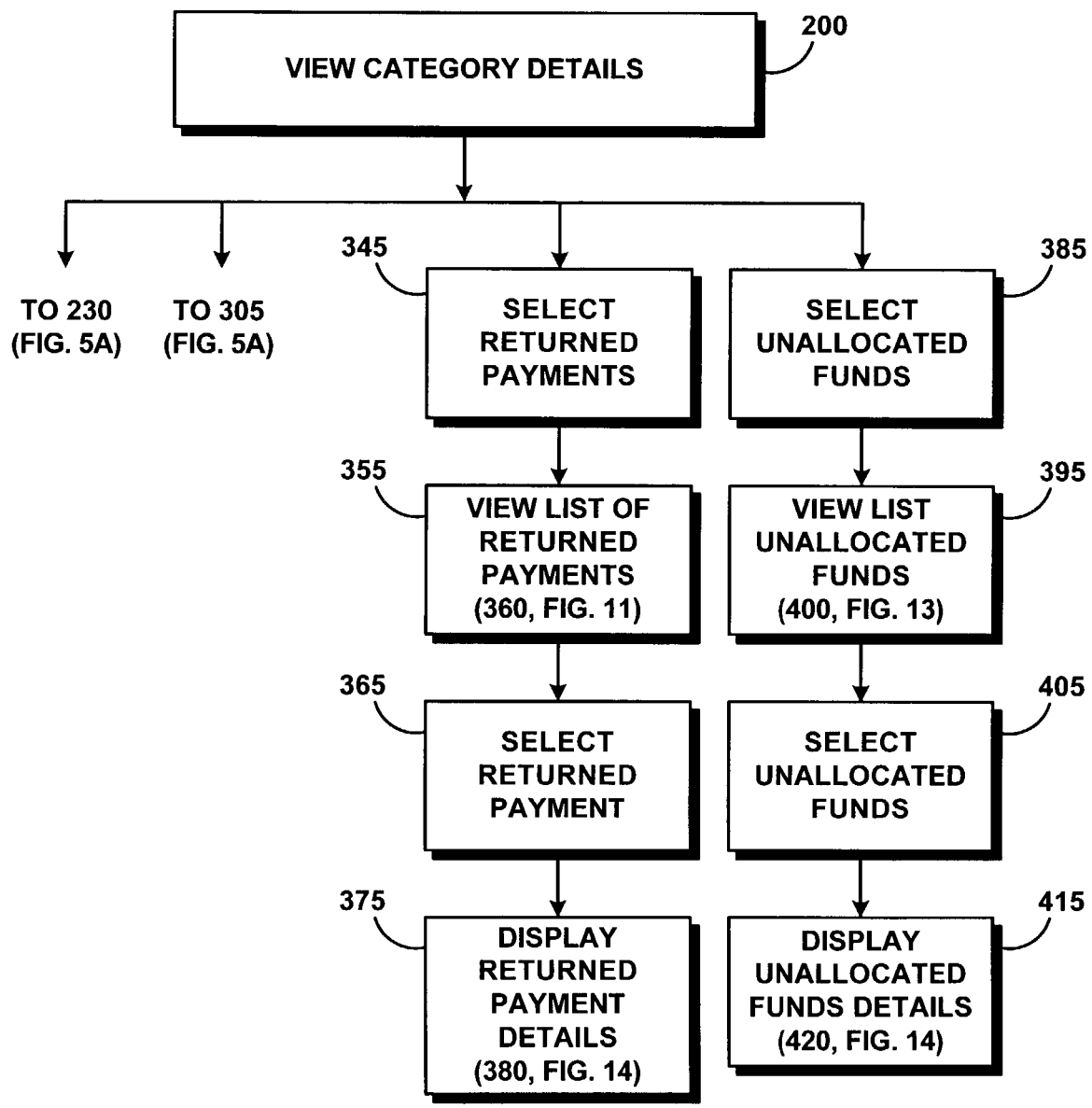

Exemplary optional steps that could be taken by the user to view the category details (step 200 of FIG. 2) are shown in FIG. 5. When the user selects the invoice summary 210 (step 230), system 10 displays, and provides the ability to download the invoice summary list view screen 240, in step 235, as shown in FIG. 6.

Figure 6:
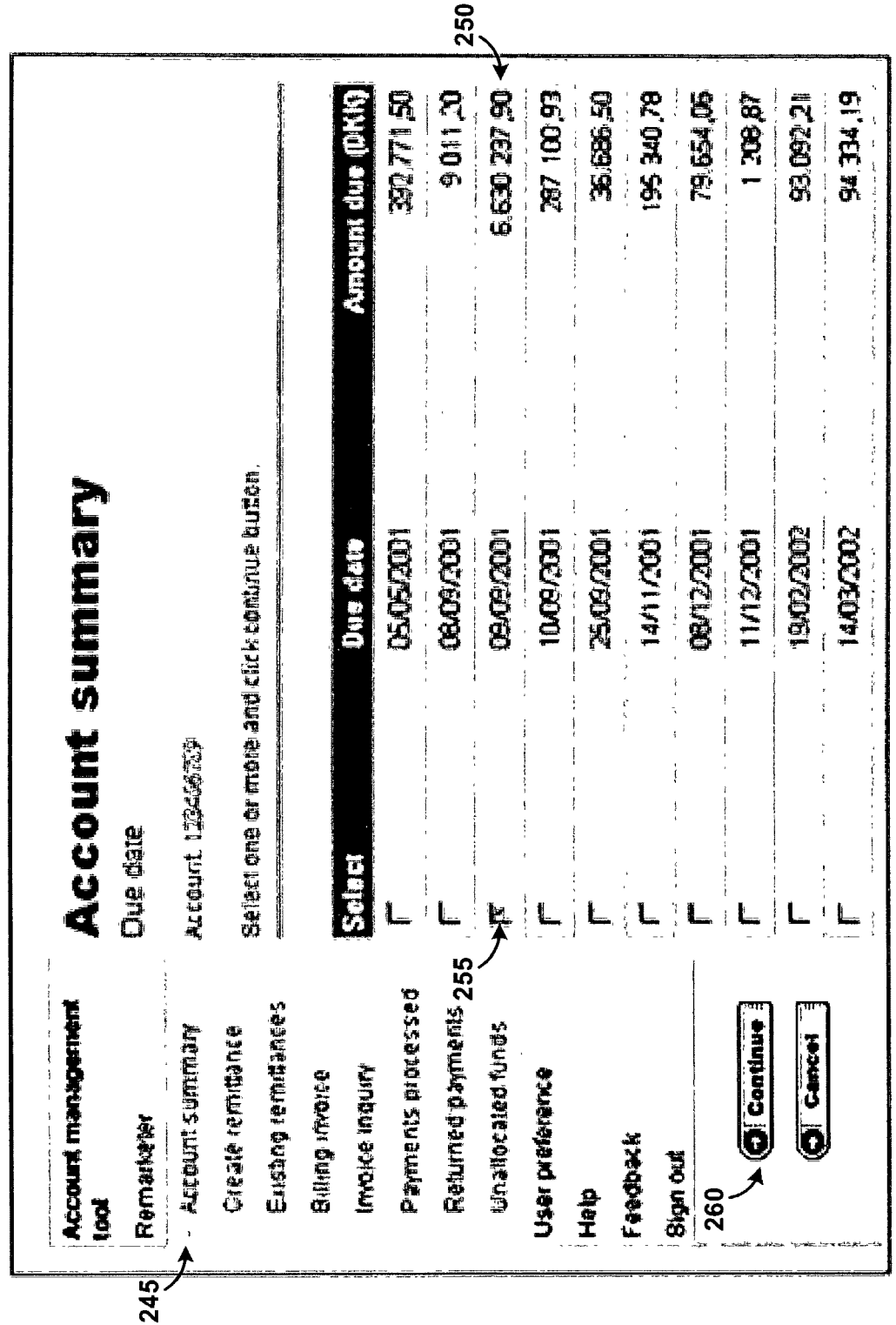
FIG. 6 is a high-level overview screen for the payment plan invoices billed by the finance company to the customer.

With reference to FIG. 6, the invoice summary list view 240 is a high-level overview of payment plan invoices listing due dates and amounts due for the customer's scheduled payment plan (or SPP). To view each billing item accrued to a monthly invoice such as invoice 250, the customer checks off the select box 255 for the invoice 250 (step 255 of FIG. 5). The customer then clicks on the continue button 260 to display, in step 265 of FIG. 5, the invoice summary detail screen 270 shown in FIG. 7 for the selected invoice 250.

With reference to FIG. 7, the invoice detail screen 270 lists each supplier invoice posted to the customer's SPP, along with the due date, purchase order number, supplier, supplier invoice number, the invoice date, and balance due to the finance company to pay the supplier's invoice. The user may either print the invoice summary by clicking button 280, or download the invoice summary by clicking button 285. Selecting the download button 285 allows the user to download the information on screen 270 to a spreadsheet (or another) format for better management. The download feature is available on the high-level summary screens for both customers and suppliers.

Additional details for each invoice can be viewed by clicking on an invoice line such as invoice 275, to select the invoice in step 280 of FIG. 5. When the user clicks on invoice line 275, system 10 displays in step 290 of FIG. 5, the individual invoice screen 295 as shown in FIG. 8.

Figure 8:
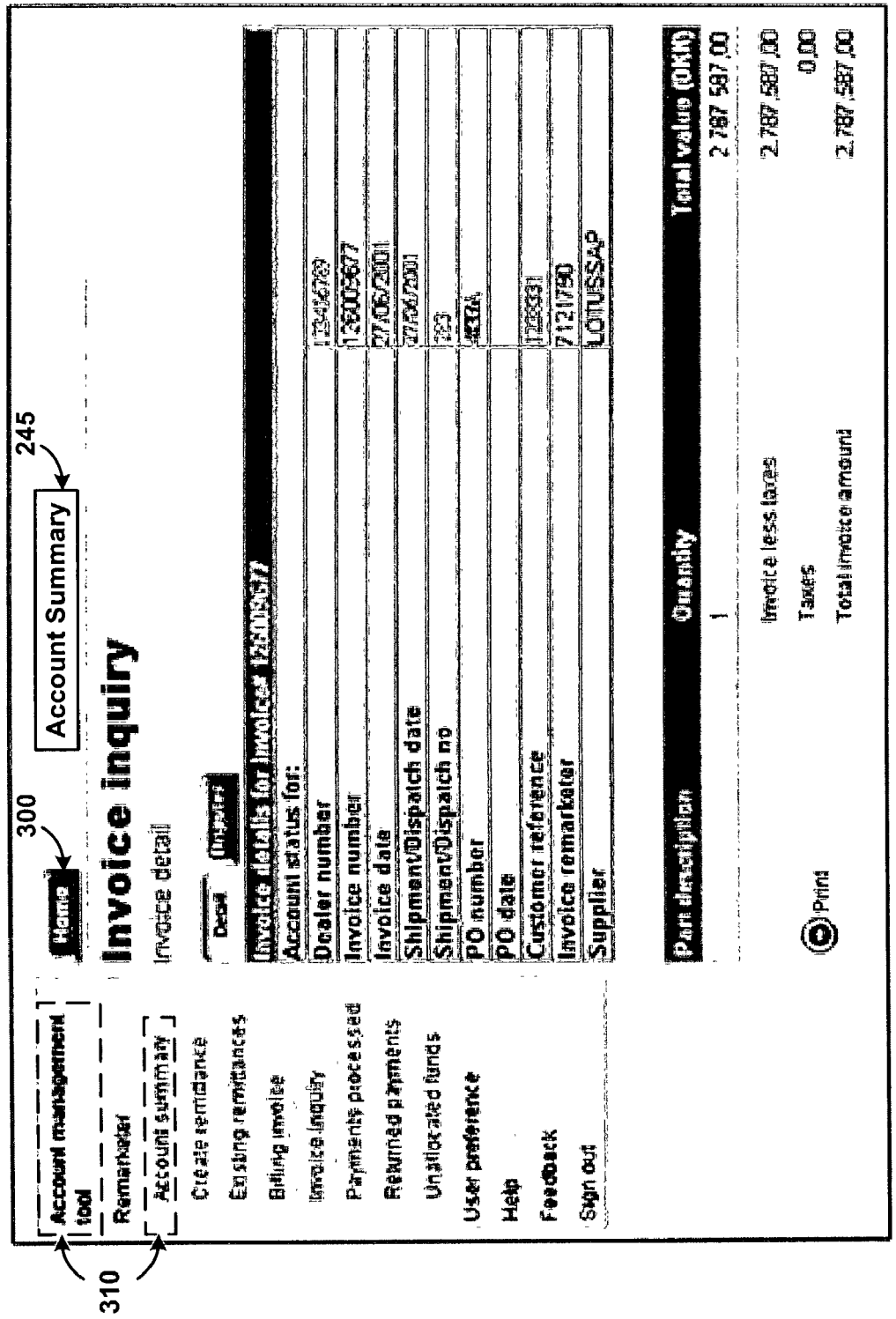
FIG. 8 shows a detail screen for one invoice billed to the customer within one payment period.

With reference to FIG. 8, by clicking on an account management tool button 245, the user now returns to his or her home page 180 (FIG. 4). The user wishes to view the details for the billing invoices posted by the finance company to the customer's account. Billing invoices detail the fees applied to the customer's account by the finance company, i.e., charges that the customer accrued on the customer's account, such as interest charges, late fees, returned payments, returned payment fees, etc. The user can then view these details by clicking billing invoice summary 215 (shown in FIG. 4) in step 305 of FIG. 5. Alternatively, the user may navigate from FIG. 8 or any other screen directly to the billing invoice summary 215 by clicking on "billing invoice summary" 310 (FIG. 8).

System 10 displays in step 315 a high-level overview of billing invoices on the billing invoice summary screen 320, as shown in FIG. 9. The user selects a billing invoice to view in step 325 by clicking on the corresponding line, such as billing invoice 330 (FIG. 9). System 10 then displays in step 335 the billing invoice detail screen 340 of FIG. 10, showing details of the charge applied to the customer's account such as invoice date, due date, outstanding balance, status, paid amount, and date paid.

As described earlier, by clicking on the account management tool button 245 of FIG. 8, the user returns to his or her home page 180 (FIG. 4). The user wishes to view the returned payments posted by the finance company to the customer's account. Returned payments are those payments that could not be posted to the customer's account because, for example, they did not clear the customer's bank account. The user can then view the return payment details by clicking returned payments 220 (shown in FIG. 4) in step 345 of FIG. 5. Alternatively, the user may navigate from FIG. 10 or any other screen directly to the returned payments summary by clicking on "returned payments" 350 (FIG. 10).

Figure 11:
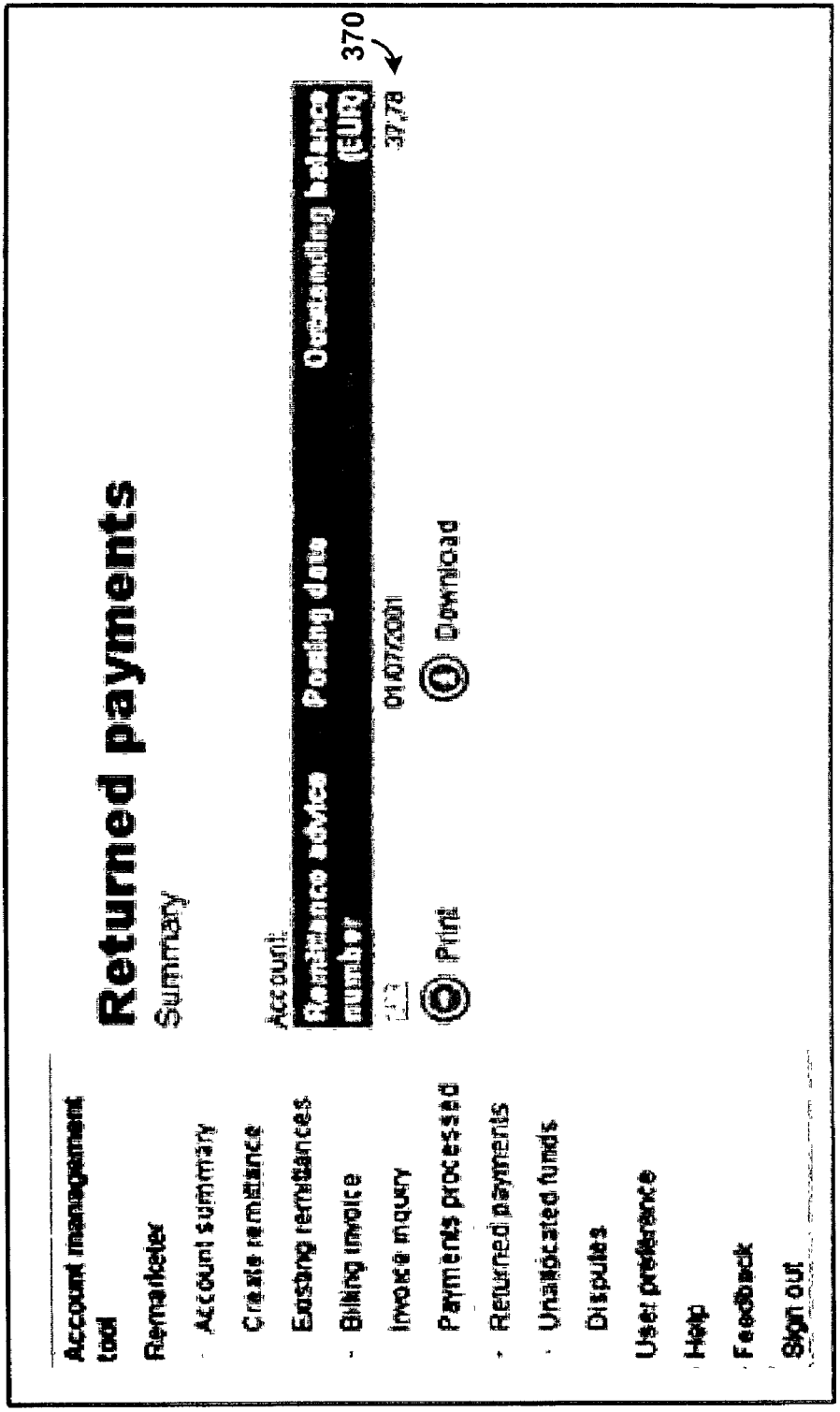
FIG. 11 is the returned payments summary screen showing a high-level overview of returned payments.
Figure 12:
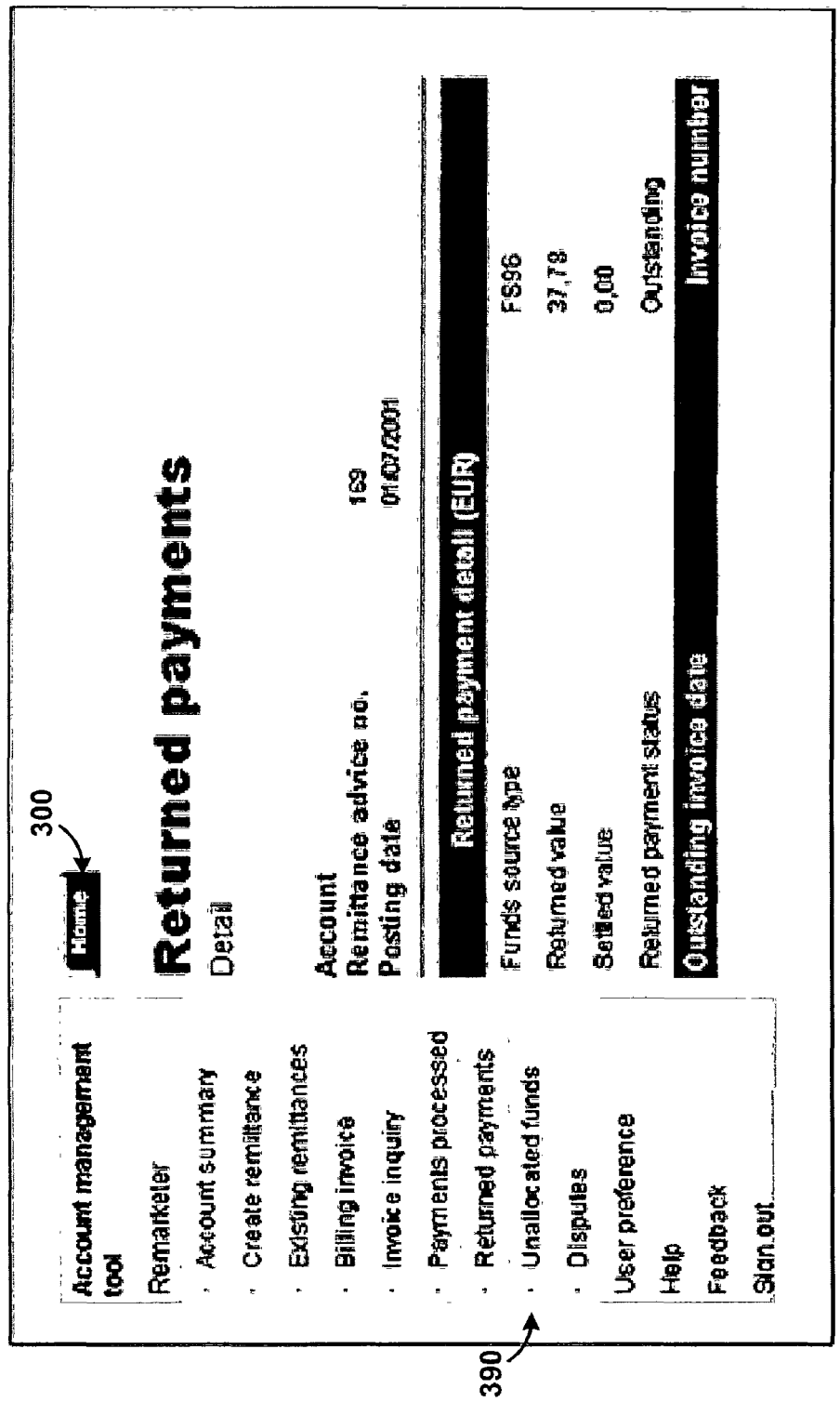
FIG. 12 displays the returned payments detail screen.

In step 355 of FIG. 5, system 10 displays a high-level overview of returned payments on the returned payments summary screen 360 as shown in FIG. 11. The user selects a returned payment to view in step 365 by clicking on the corresponding line, such as returned payment 370 (FIG. 11). System 10 then displays in step 375 the returned payments detail screen 380 of FIG. 12, showing details of the returned payment such as posting date, returned value, settled value, and returned payment status The user may return to his or her home page 180 (FIG. 4) by clicking on the account management tool button 245 (FIG. 8). Wishing to view the unallocated funds available to the customer for payments, the user clicks unallocated funds 225 in step 385 of FIG. 5. Alternatively, the user may navigate from FIG. 12 or any other screen, directly to the unallocated funds summary by clicking on "unallocated funds" 390. Unallocated funds are credits available to the customer for allocating to various debits posted to the client's account. These credits can be customer payments or deposits to the finance company, credits from suppliers, credit extended to the customer by the finance company, etc. One aspect of the commercial financing payment planner system 10 is the flexibility afforded the client in applying funds to invoices or fees at the customer's discretion.

Figure 14:
FIG. 14 displays the unallocated funds detail screen.

System 10 displays, in step 395 of FIG. 5, a high-level overview of unallocated funds on the unallocated funds summary screen 400, as shown in FIG. 13. The user selects an unallocated fund to view in step 405 by clicking on the corresponding line, such as returned payment 410 (FIG. 13). System 10 then displays in step 415 the unallocated funds detail screen 420 of FIG. 14, showing details of the unallocated fund such as value, posting date, effective date, and a listing of any funds disbursed from the unallocated funds.

With reference to FIG. 2, the customer (or client) having reviewed the account status, he or she now wishes to create a remittance in step 425, moving funds within the account or transferring funds to the account, to pay for debits or to create a credit for future purchases. The user navigates to the create remittance screen by clicking on "create remittance" 430 on the screen shown in FIG. 14 or any other screen displayed by system 10.

Figure 15:
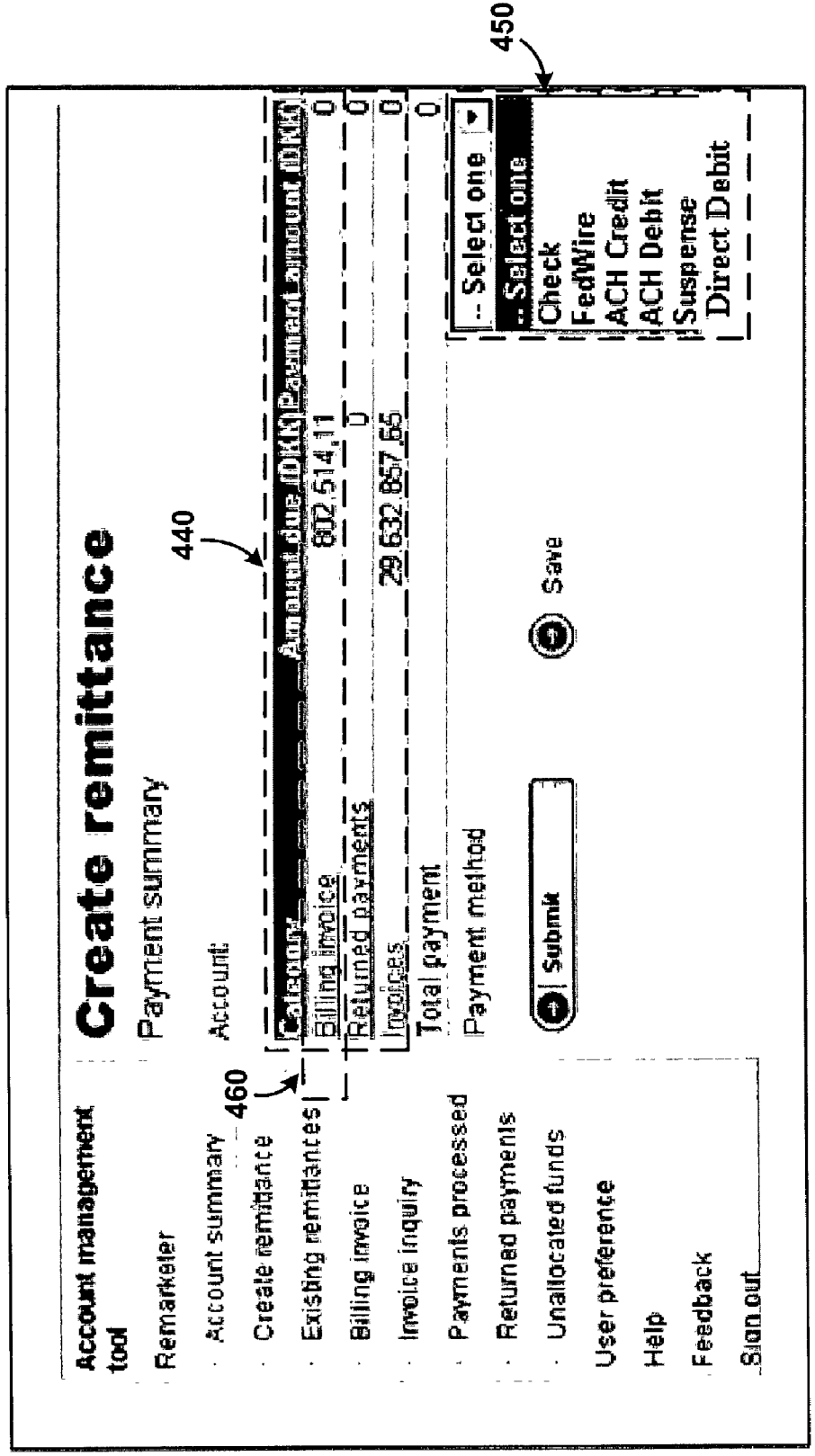
FIG. 15 is the create remittance screen showing a high-level overview of the categories available to a user wishing to create a remittance or other payments.

In response, system 10 displays to the user the "create remittance" summary screen 435 of FIG. 15. The create remittance summary screen 435 is a high-level overview listing a number of categories 440 the user may select during the process of creating a remittance (i.e., billing invoice, returned payments, invoices, credits, or unallocated funds).

Figure 16A:
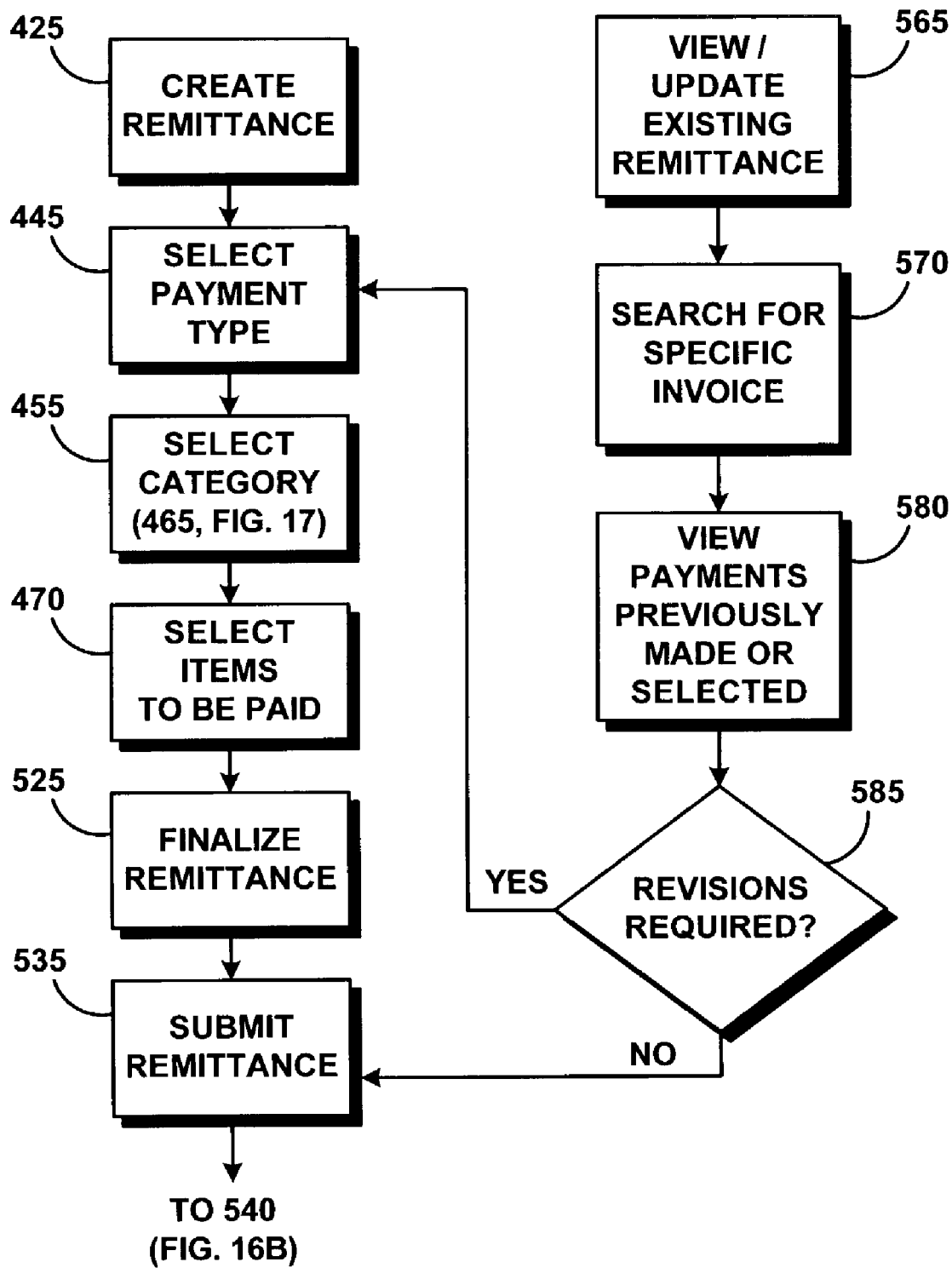
FIG. 16 is comprised of FIGS. 16A and 16B, and illustrates the process used by the system of FIG. 1 to create and view and/or update remittances.
Figure 16B:
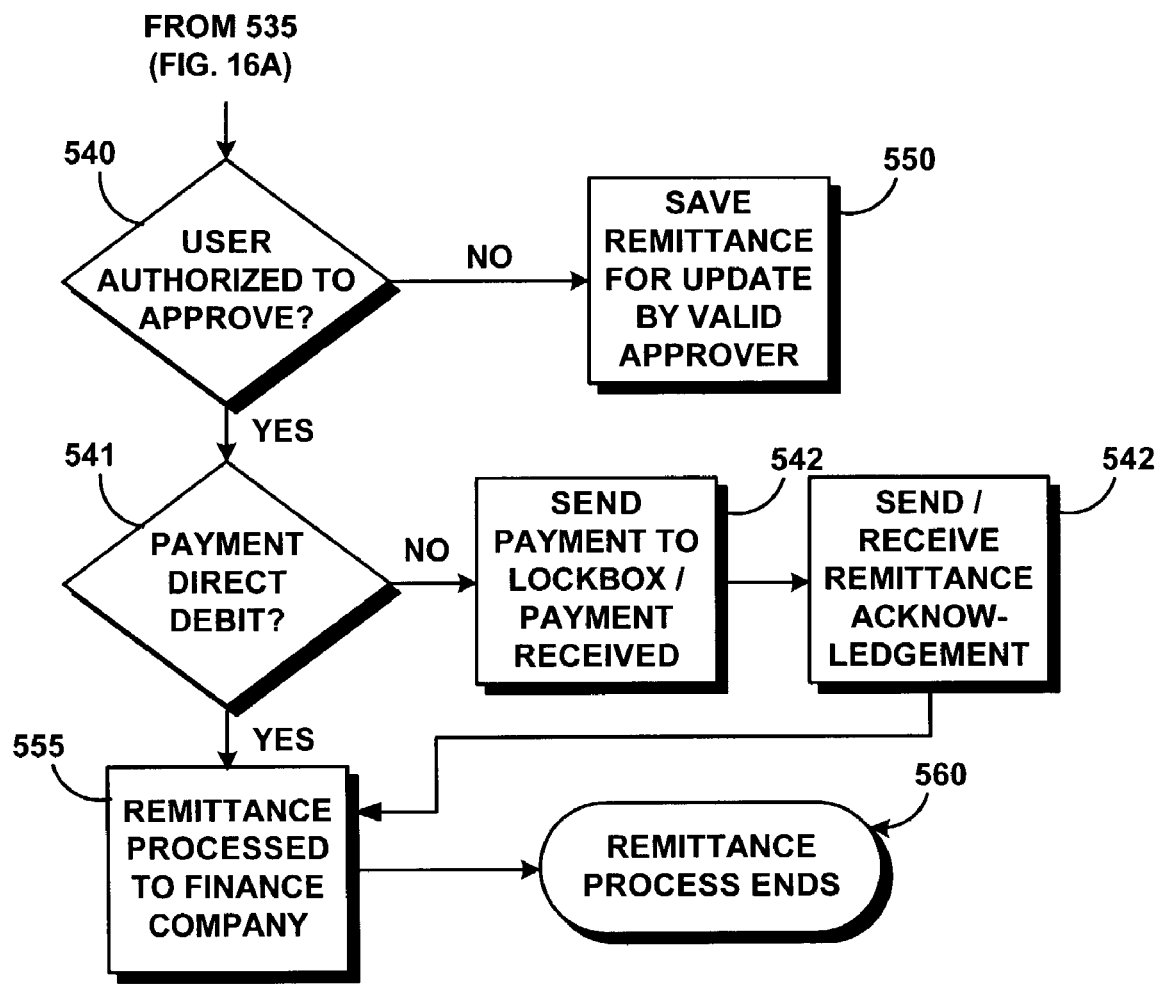

The steps taken by the user to create a remittance (step 425 of FIG. 2) are shown in FIG. 16. Referring now to FIG. 16, the user selects the payment method for the remittance in step 445 from the pull-down menu 450 of FIG. 15. One feature of system 10 is the variety of payment options available: check, wire transfer, credit or unallocated fund, direct debit initiated by the customer, automatic clearing house, or direct debit within the customer's profile.

The direct debit initiated by the customer allows the customer to initiate the debit process. The customer informs the finance company which invoices he or she wishes paid from specified credit notes. The finance company applies the customer's instructions in transferring funds from the customer's account to the supplier's account or the finance company's account.

The option for creating a remittance, a direct debit within the customer's profile, is yet a feature of the commercial financing payment planner system 10. Before the SPP due date, system 10 searches the customer's account for invoices requiring payment by the due date. If an invoice requiring payment is found, system 10 automatically creates a remittance for that invoice based on remittance advice previously provided by the customer.

System 10 follows the instructions in this remittance to transfer funds from the customer's account to the supplier without customer approval for the specific transfer; the customer having already provided approval through the creation of the remittance advice. System 10 then creates a remittance document that displays the remittance information to the client.

After selecting the payment method 450 (FIG. 15), the user selects in step 455 of FIG. 16, the category for remittance such as billing invoice 460 by clicking on the invoice line 460 of FIG. 15. System 10 then displays the invoice summary screen 465, shown in FIG. 17.

In step 470 of FIG. 16, the user selects one or more invoices to be paid by checking off, for example box 475 (FIG. 17) for invoice line 480 (FIG. 17), then clicking the continue button 485. System 10 then displays on the invoice summary screen 490 of FIG. 18, the supplier invoices and other debits associated with the billing invoice 480.

The user then selects the items he or she wishes to pay by checking off box 495 (FIG. 18) for each invoice to be paid. For example, the user may select invoices 500 (FIG. 18) for payment, but not invoice 505 because the shipment of goods in that invoice has been delayed. The user then selects "save and return" 510 to save this remittance and return to the create remittance screen 515 shown in FIG. 19. The total payment 520 (FIG. 19) is now shown for the invoices selected by the customer.

Figure 19:
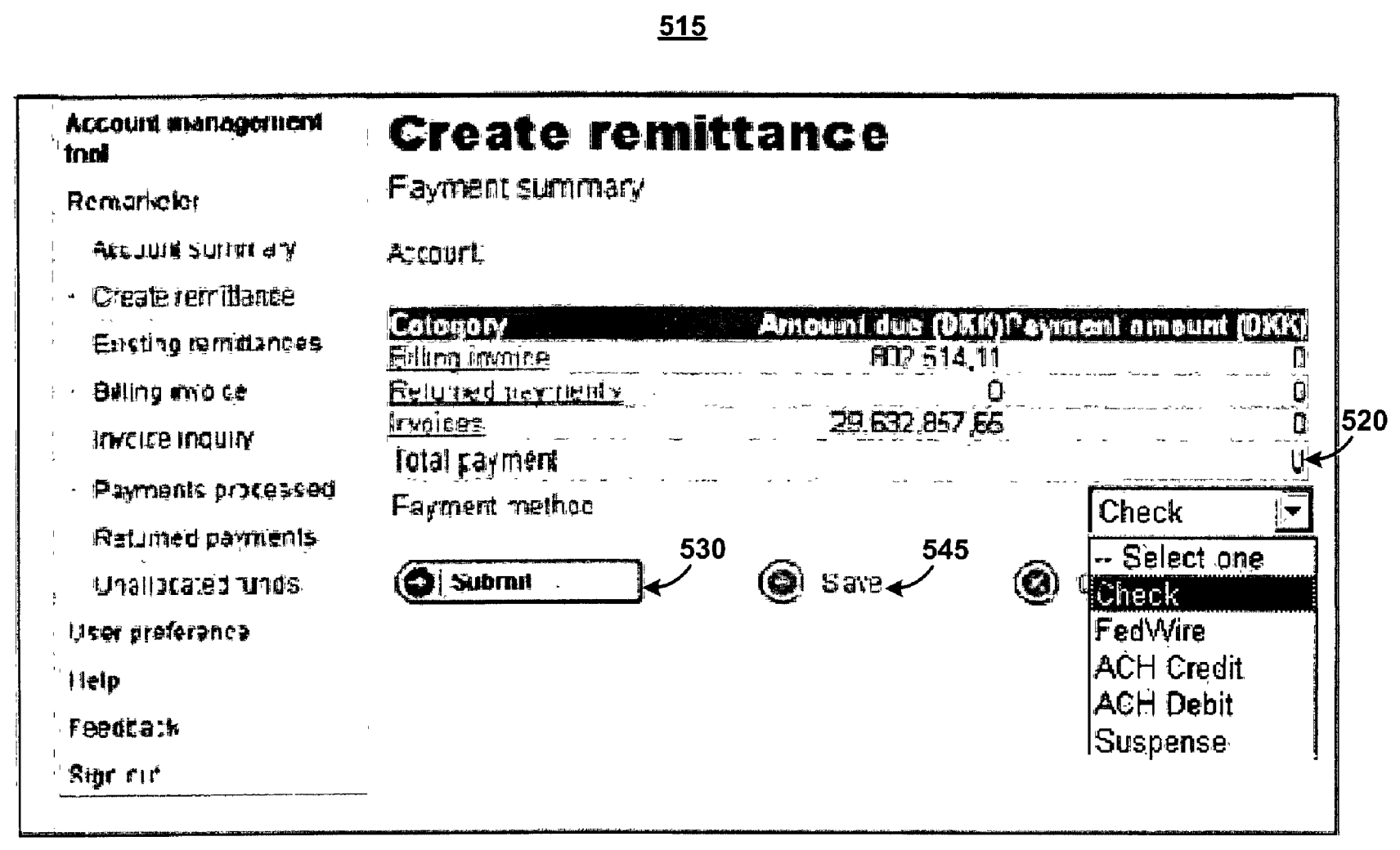

Having thus created the remittance document, the user finalizes the remittance in step 525 of FIG. 16, by adding other payments and items to be paid, as necessary. With reference to FIG. 19, the user now clicks the "submit" button 530 to submit the remittance document in step 535 for processing and payment.

A feature of the commercial financing payment planner system 10 is the level of entitlement set by the customer for different users. At the discretion of the customer, different employees can have different levels of entitlement in the accounts payable process. For example, one employee may have authorization to create remittances, but not be able to submit them for payment to the finance company. In that case, the submit button 530 of FIG. 19 will not be displayed by system 10 on the create remittance screen 515.

With reference to FIGS. 16 and 19, if the user does not have the submit authority in step 540, the user may save the remittance document by clicking on the save button 545. An accounts-payable manager with submission entitlement can then later review the remittance document and submit it for payment to the finance company. In the case that the user does have remittance submission entitlement in step 540, the document is processed by the finance company in step 555 and the remittance process ends in step 560.

With reference to FIGS. 2 and 16, the user may wish to review, update, or submit an existing remittance, as shown by step 565 of FIG. 2, and illustrated in more detail in FIG. 16. The user searches in step 570 for a specific invoice or remittance document by entering the desired search criteria in the search field 575 on the home screen 180 of FIG. 2.

For illustration purpose, an accounts payable manager searches for a remittance document created by an employee without submission entitlement. The remittance document has been saved pending the manager's approval. After finding the document, the manager reviews payments previously made or selected in step 580. If revisions are not required (decision step 585), the manager submits the remittance in step 535, and the remittance is processed in step 555, as described earlier.

If, however, revisions are required in decision step 585, the manager selects the revised payment type in step 445, selects the category, in step 455, selects items to be paid in step 470, and finalizes the remittance in step 525. The manager then submits the revised remittance in 535 and the remittance is processed by system 10 in step 555, as described earlier.

With reference to FIG. 2, another action that can be taken by a customer in managing his or her account with the finance company is to initiate/research a dispute 590. A dispute is a party perceived error in the supplier's invoice.

One feature of the commercial financing payment plan system 10 is the ability to suspend interest charges for the funds associated with a disputed invoice until a dispute has been resolved. Once the dispute is resolved, system 10 charges the interest to the supplier if the invoice was in error or to the customer if the invoice was correct.

To access the dispute functions of system 10, the customer clicks on "disputes" 595 on the user's home page 180 (FIG. 4). In response, system 10 displays the dispute high-level summary screen 600 of FIG. 20. Possible actions the user may take are:

create a new dispute on an open invoice;
create a new dispute on a paid invoice;
create a re-dispute;
edit a saved dispute;
download dispute; and/or
search disputes.

An open invoice is one that has not yet been paid. System 10 maintains all the invoice information for unpaid accounts. Consequently, the customer can look up the invoice information for the customer any invoice to research the possibility of a billing error. In the case the dispute is for an invoice already paid, the customer can enter the invoice information for the finance company to submit to the supplier.

The customer might "create a re-dispute" when a dispute is resolved as invalid; i.e., a payment on an invoice is due, but the customer has additional information regarding the dispute that might change the outcome of the dispute. To make changes to a current dispute, the customer selects "edit a saved dispute". With this function, the user may edit an existing dispute and then save it to a new form, allowing the customer to come back at a later time and complete it. "Download dispute" allows the customer to download the dispute document so they can perform their own dispute tracking. Further, the "search dispute" feature allows the user to locate and track disputes once they are submitted.

Figure 21A:
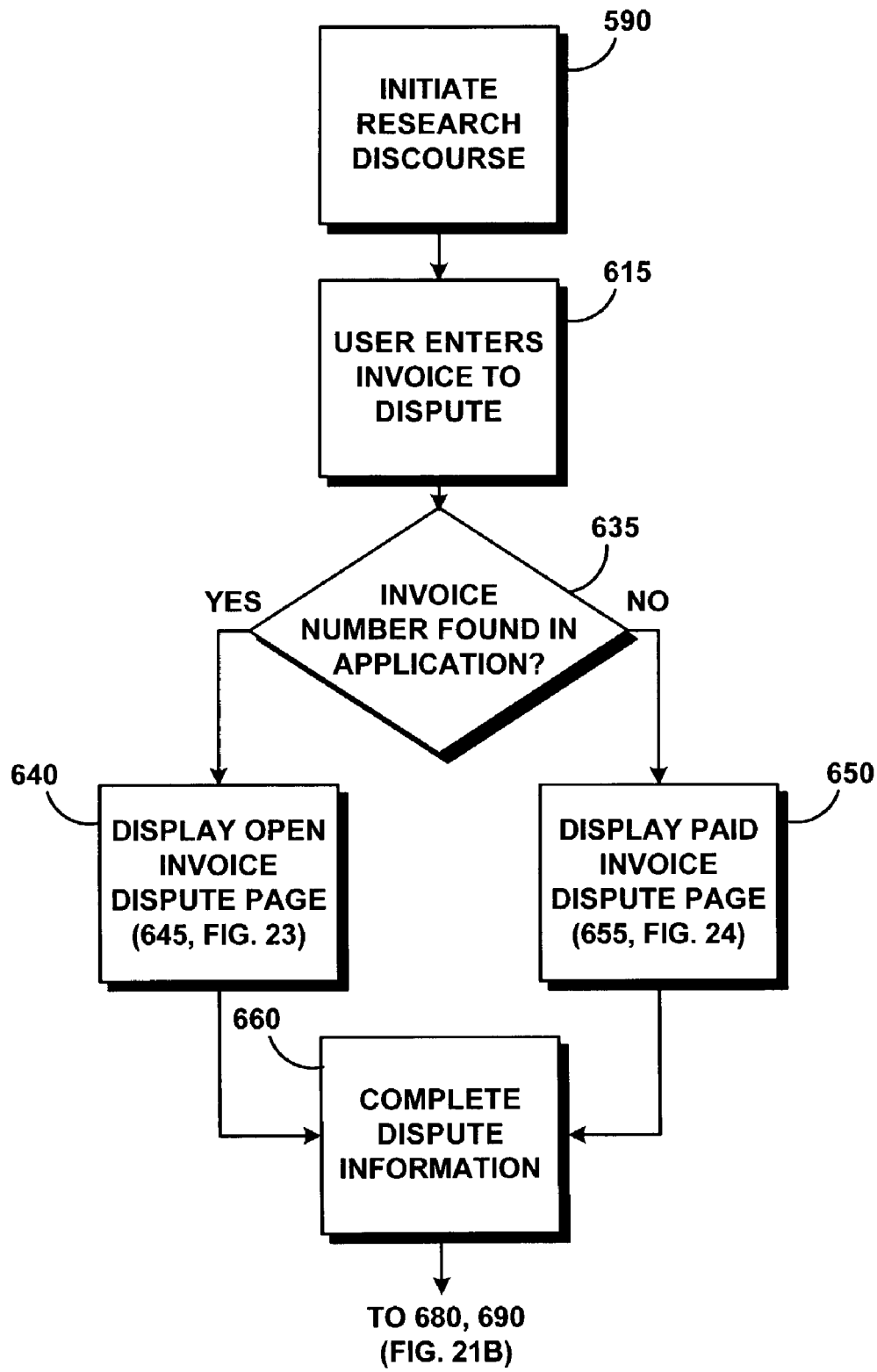
FIG. 21 is comprised of FIGS. 21A and 21B, and illustrates in a flow chart the process of creating a dispute.
Figure 21B:
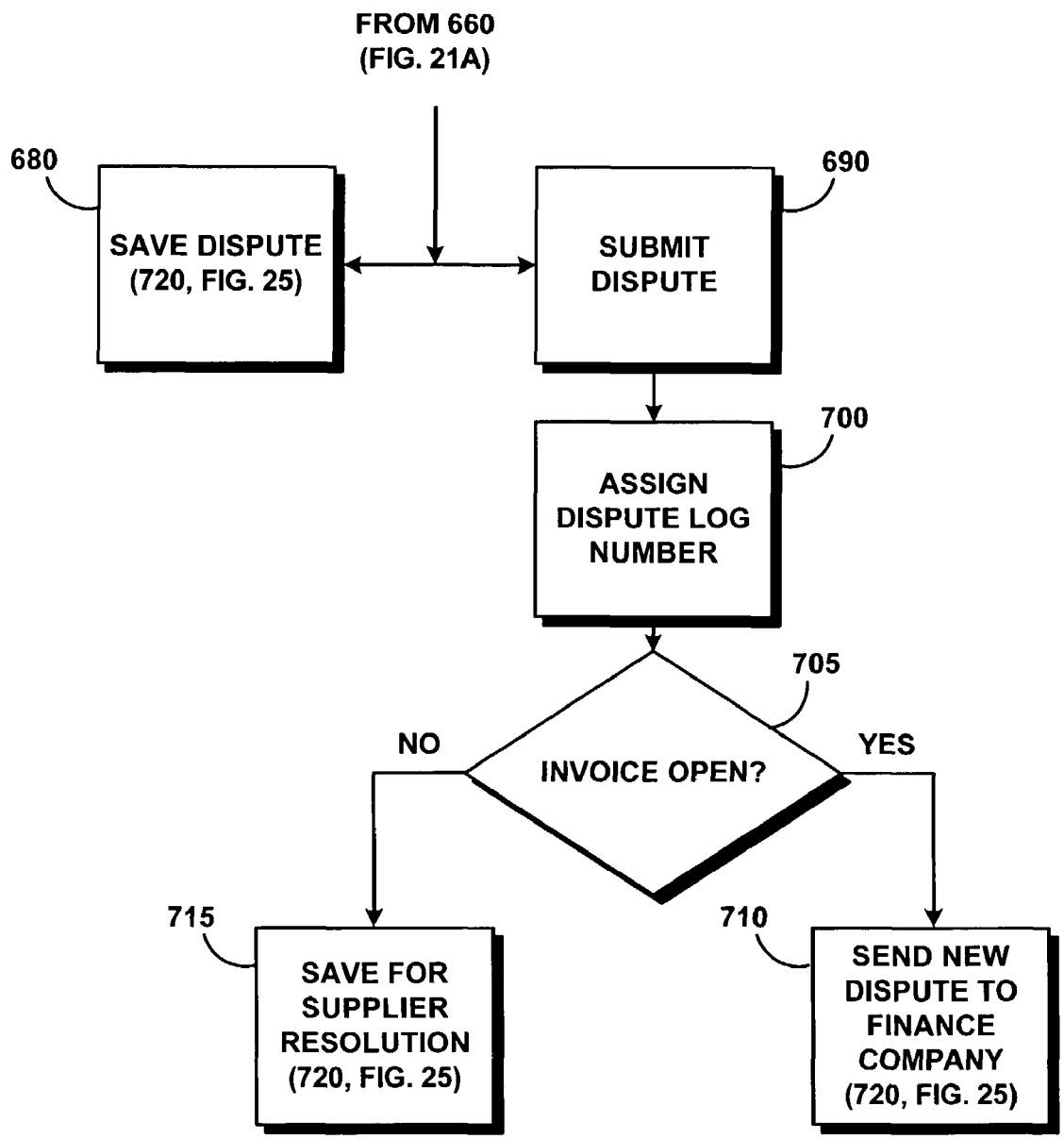
Figure 22:
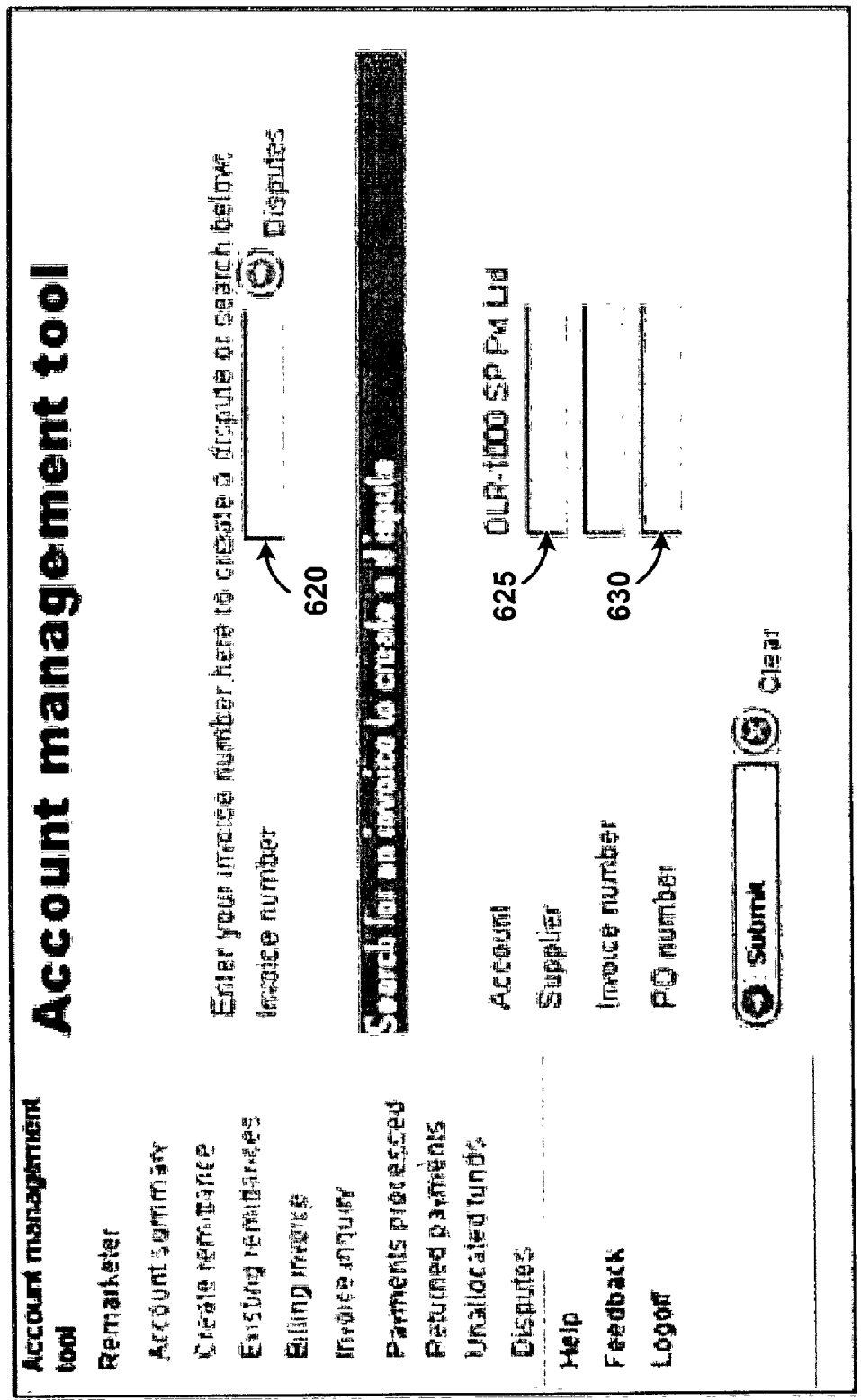
FIG. 22 displays the search screen for finding the invoice against which the user wishes to create a dispute.

In operation and with reference to FIGS. 20 and 22, and to the dispute flow chart (or method) of FIG. 21, the user selects "create a new dispute on an open invoice" 605. System 10 responds with a search screen 610 (FIG. 22). To locate an invoice for dispute in step 615, the customer can either enter the specific invoice number 620 or perform a more general search by entering information such as supplier 625 or purchase order (PO) number 630.

Figure 23:
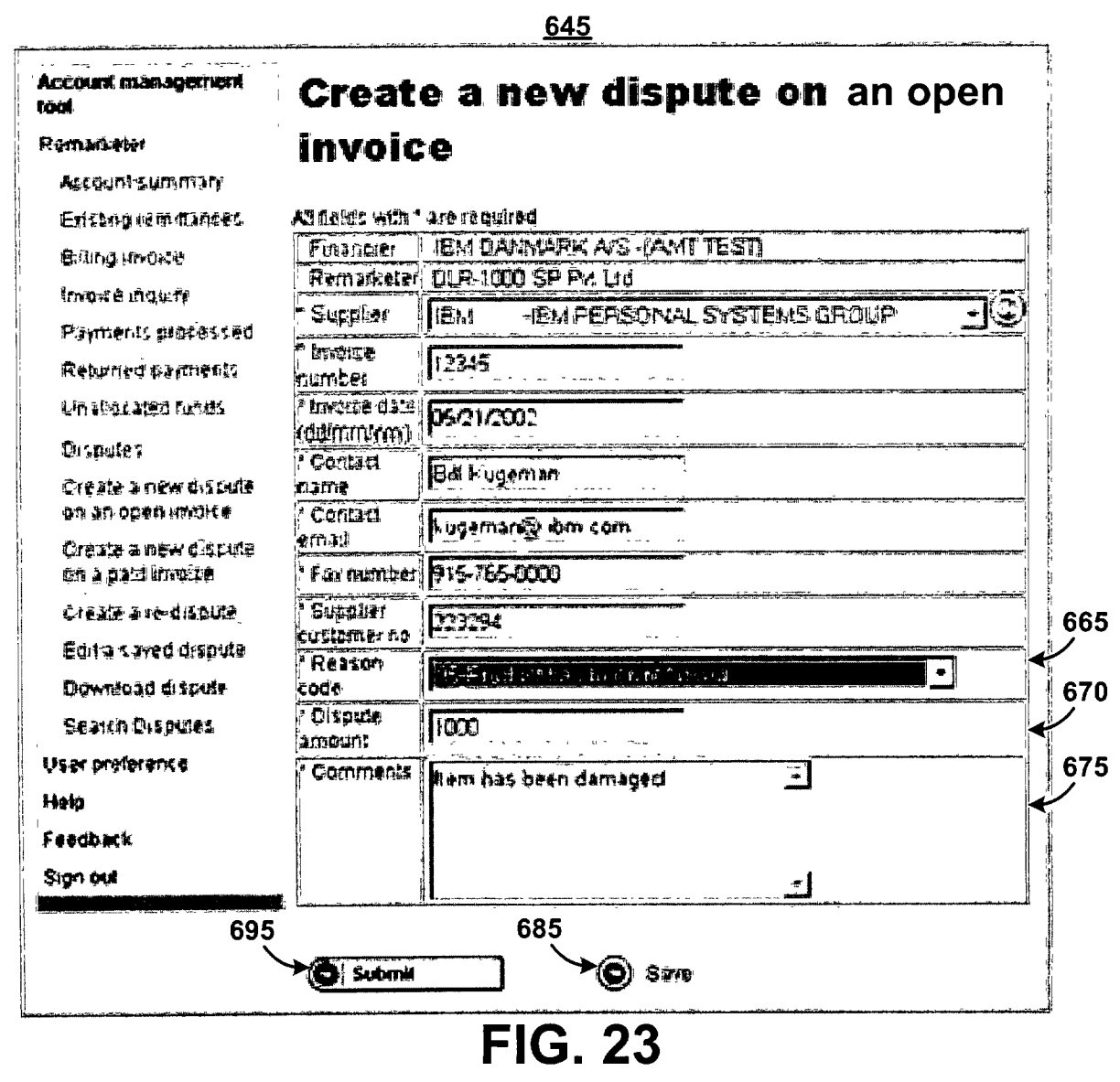

If the user enters the invoice number 620, system 10 automatically pastes the appropriate information in the supplier field 625 and the PO number field 630. In either case, the system searches for an open invoice. If the invoice number is found in the application in step 635, system 10 displays in step 640 the invoice information as shown in the "dispute on an open invoice" screen 645 (FIG. 23).

Figure 24:
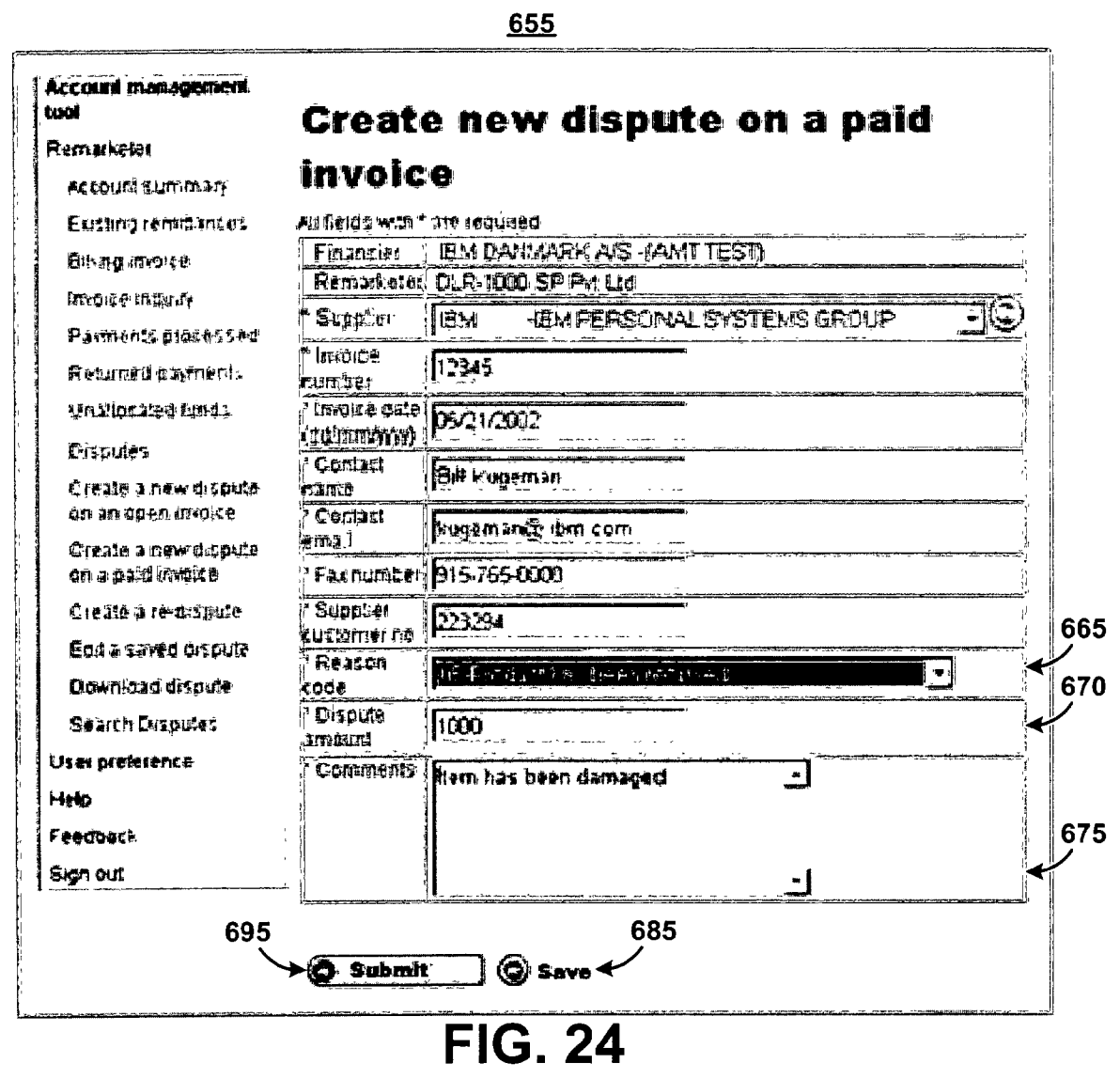

If the invoice number is not found in the system, system 10 displays in step 650 the invoice as shown in the "dispute on a paid invoice" screen 655 (FIG. 24) with blank fields for the customer to enter. The customer then enters information as required in step 660 in the displayed dispute screen, including the reason code 665 for the dispute, the dispute amount 670, and any supporting information or comments 675.

At this stage, the customer may either save the dispute in step 680 by clicking on "save" 685 or submit the dispute in step 690 by clicking on "submit" 695. System 10 then assigns a log number to the dispute in step 700. If the invoice is open in step 705, system 10 sends the dispute to the finance company for resolution in step 710. Otherwise, system 10 saves the dispute for supplier resolution in step 715.

Figure 25:
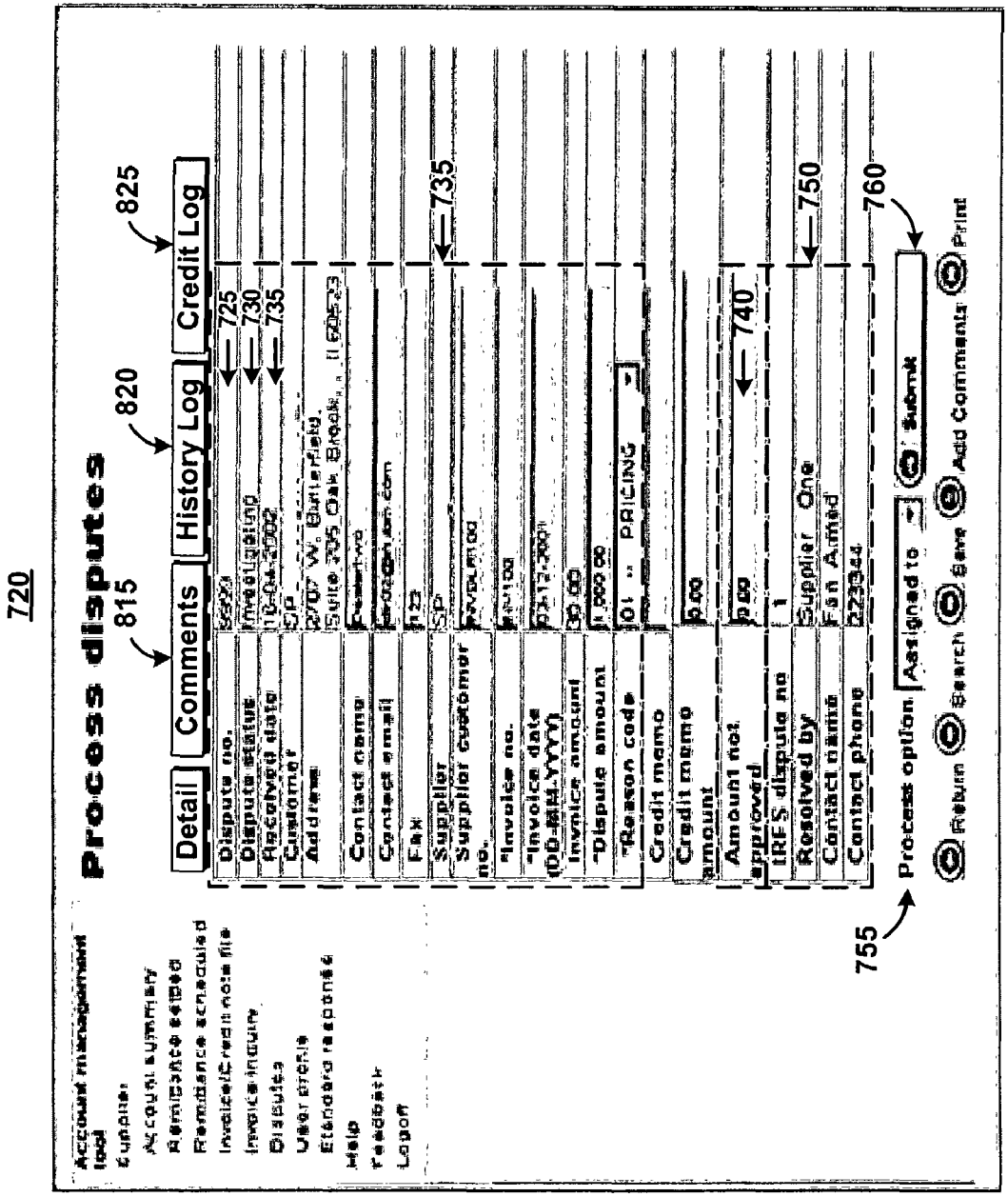
FIG. 25 exemplifies a completed dispute document.

The dispute document 720 created by system 10 pursuant to steps 680, 710 and/or 715 of the dispute process of FIG. 21, is shown in FIG. 25. The dispute document 720 can be viewed by all parties involved in the dispute: the customer, the supplier, and the finance company. The ability of all parties involved in the dispute to view the dispute and to track its progress is a feature of the commercial financing payment planner system 10.

With reference to FIGS. 21 and 25, the finance company assigns a dispute number 725 at step 700, and the date the dispute 730 is submitted. The supplier updates the dispute status 735 during the dispute process.

If the dispute involves an open invoice, system 10 also assigns a host dispute log number 740 that establishes a cross-reference to the finance company's billing system. This feature of the commercial financing payment planner system 10 allows the finance company to internally track the dispute and manage the dispute process. The customer information 745 on the dispute document 720 is entered by the customer on the dispute creation screens 645 (FIG. 23) or 655 (FIG. 24) and used by the supplier during the dispute resolution process.

The initial response of the supplier to the dispute is to assign the dispute to a person in its organization who owns the responsibility for resolving this dispute. The supplier provides that supplier information 750 to the dispute document as "resolved by," contact name, and contact telephone number. At the bottom of the dispute document 720 is a pull-down menu listing choices for the dispute process option 755 available to the supplier. This process option is shown in more detail in FIG. 26.

The four choices for process option 755 are "assigned to," "approved," "not approved," or "partial". If the supplier selects process option 755 "assigned to" and clicks the submit button 760 of FIG. 25, system 10 presents the supplier's process dispute assignment screen 765, shown in FIG. 27. The supplier can then manually select the person it wishes assigned to the dispute by clicking on the select button 770 and clicking the submit button 775.

Figure 27:
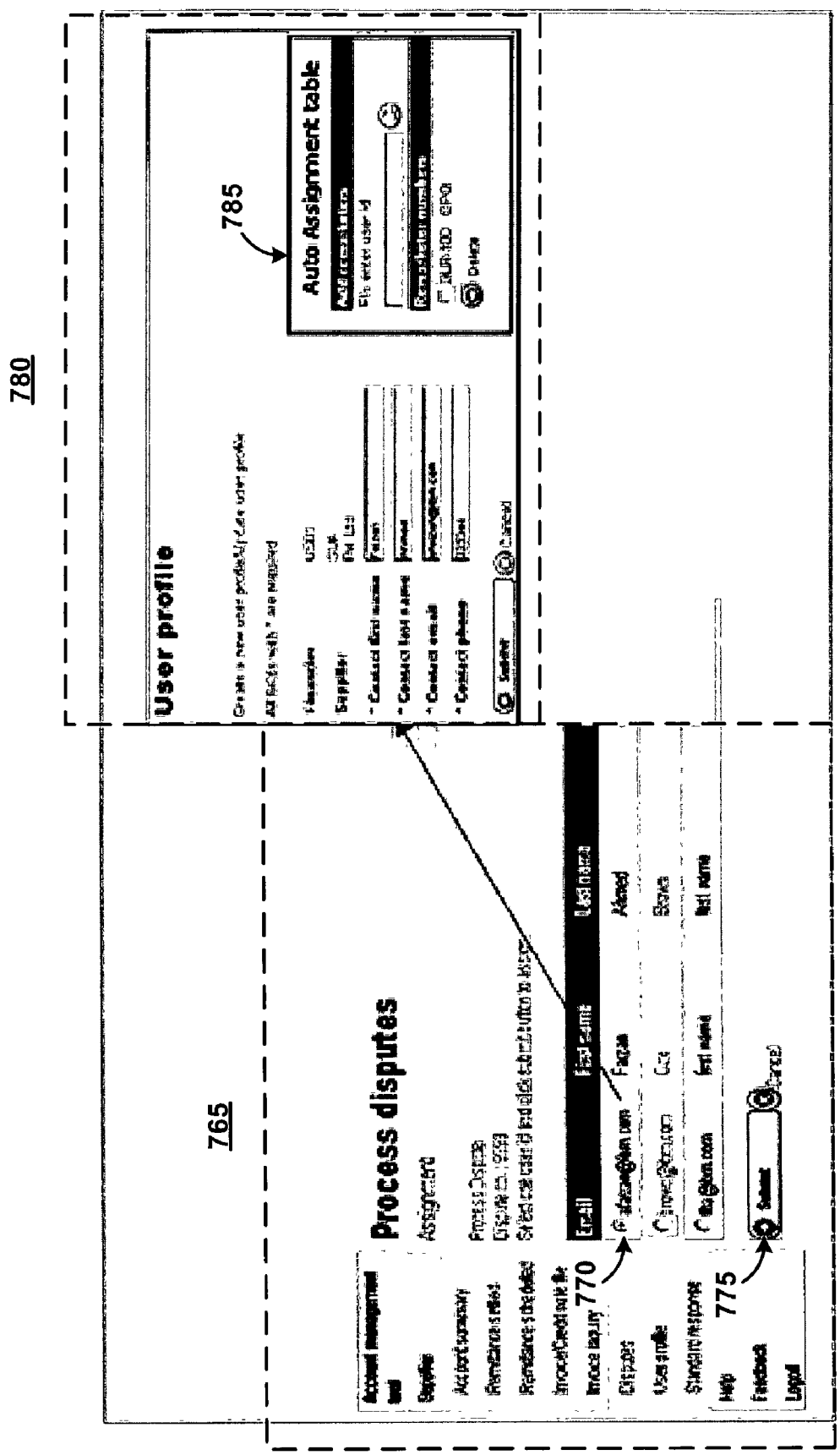
FIG. 27 shows the supplier's entry screen for assigning contacts to disputes along with the option for auto assignment.

Alternatively, the supplier can create in its user profile 780 an auto assignment table 785 (FIG. 27). Auto assignment allows the supplier to enter contact information for persons responsible for settling disputes and link them to their customer accounts, so that any dispute filed by a linked customer is automatically assigned to that person.

Figure 26:
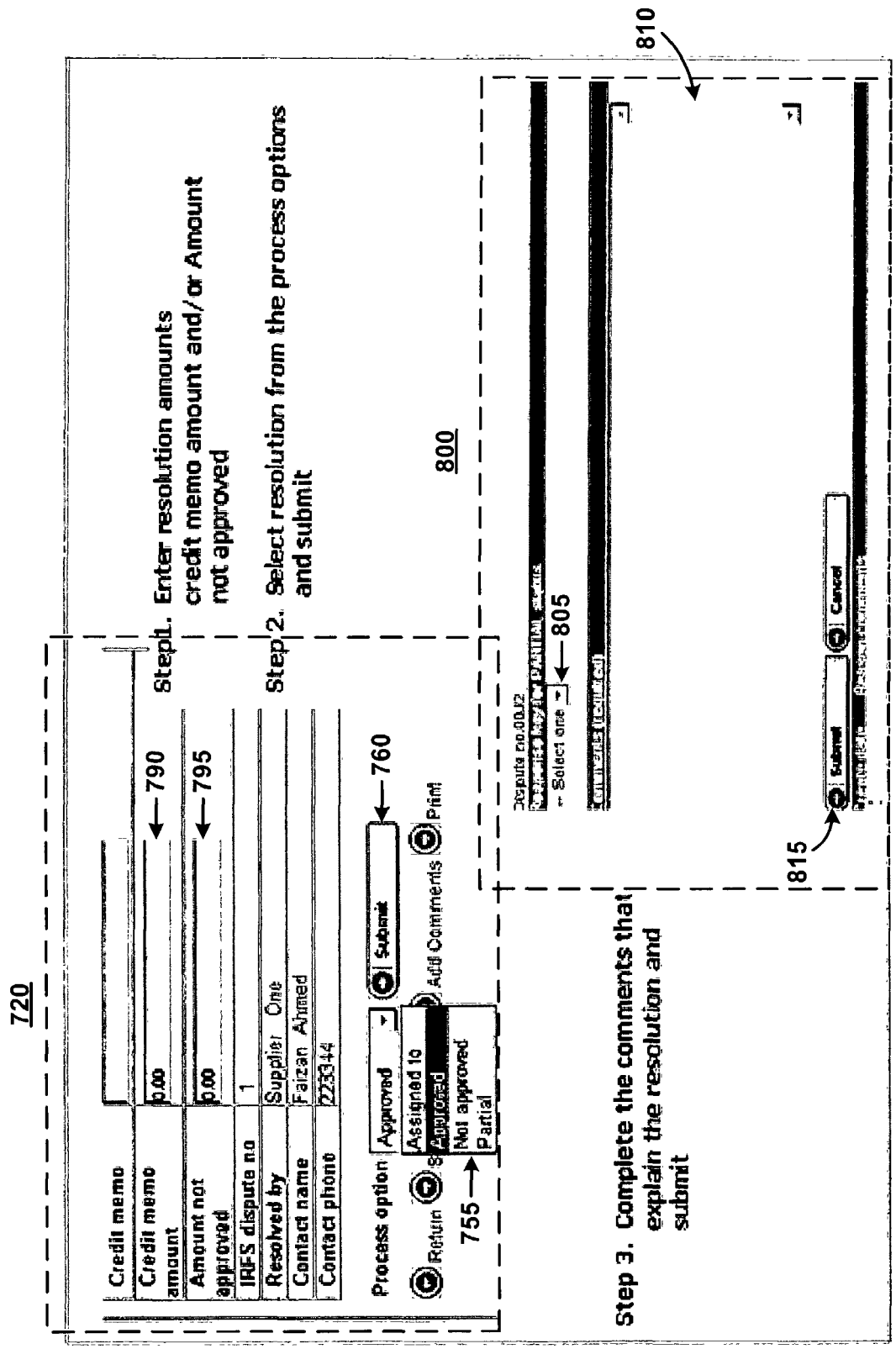
FIG. 26 illustrates entry by the supplier in the dispute document.

With reference to FIGS. 25, 26, and 27, the second process option 755 available to the supplier is "approved". If the supplier chooses the "approved" option, the supplier must enter a value in the credit memo amount 790, crediting the customer with the disputed amount. The credit memo amount 790 must be equal to, or greater than the dispute amount so that the customer owes no payment to the finance company for any portion of the dispute, otherwise the dispute is not "approved."

If the supplier chooses the third process option 755, "not approved", the supplier must enter a value equal to the dispute amount in the "amount not approved" 795 field. If the dispute is "not approved," the supplier expects full payment by the customer for the dispute amount.

If the supplier chooses the fourth process option 755, "partial", the supplier agrees that a portion of the dispute has merit, and gives the customer a partial credit. The supplier enters the amount allowed to the customer in favor of the dispute in the credit memo amount 790 field and then enters the amount not allowed in the "amount not approved" 795 field. The credit memo amount 790 and amount not approved 795 must equal the dispute value.

Once the supplier selects the appropriate process option 755, the user clicks the submit button 760 and system 10 presents the dispute resolution comments screen 800, allowing the supplier to explain the reason for the resolution. System 10 allows suppliers to store a variety of standard responses to disputes such as "proof of delivery", etc. The user may then select among those generic responses from the pull-down menu 805.

System 10 then enters the generic response in the comments field 810 of FIG. 26, allowing the user to customize or supplement the standard response. The supplier then clicks the submit button 815 to append the comments to the dispute document. The dispute is considered resolved when the supplier selects as a process option 755 "approved," "not approved," or "partial". A feature of system 10 is the automatic issue of an e-mail to the customer at completion of the dispute process describing the dispute resolution and reasons for the resolution.

When the supplier submits information to the dispute document 720, system 10 updates the dispute status field 730 to reflect the information submitted by the supplier. A feature of the dispute process provided by system 10 is the ability by the customer, supplier, and finance company to view all the past and current activity on the dispute. Comments regarding the dispute provided by either the customer or supplier can be viewed by clicking on the comments button 820. Activities associated with the dispute can be seen by clicking on the history log button 825. Credits assigned to the customer because of the dispute can be viewed by clicking on the credit log button 830.

Figure 28:
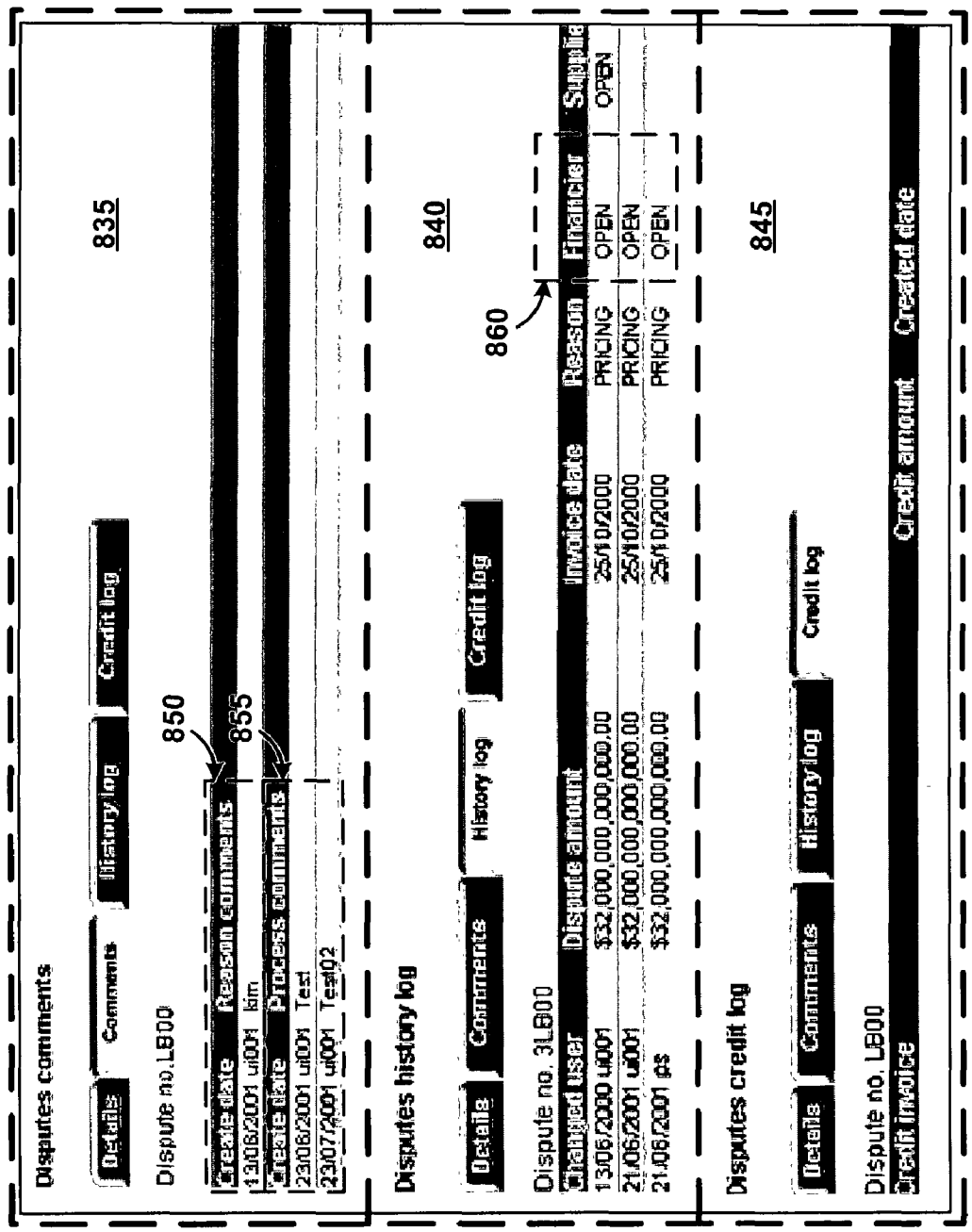
FIG. 28 displays the comments summary screen, history log, and credit log for the disputes document.

The disputes comment screen 835, disputes history log screen 840, and disputes credit log screen 845 are shown in FIG. 28. The disputes comment screen 835 lists the comments entered by the customer as reason comments 850; comments made by the supplier during the dispute process are listed as process comments 855. The disputes history log screen 840 shows all activities on the dispute and the person responsible for initiating that activity so that discrepancies can easily seen and resolved.

The financier 860 listed on screen 840 tracks the credit status of the dispute. The status of the financier 860 is either open or closed. The financier 860 opens the dispute when the customer opens it. The financier 860 then closes the dispute if the dispute is disallowed by the supplier. If the dispute is approved, the financier 860 closes the dispute when the finance company receives the credit necessary to close the dispute.

The need for the financier 860 to track dispute credit status arises from the fact that a supplier can respond to a dispute by approving it, but separately issue a credit to the customer without notifying the finance company. The financier 860 keeps the credit memo for the dispute open until the finance company receives the credit from the supplier, insuring that the dispute is closed and the credit/debit represented by the dispute is applied to the proper accounts.

The disputes credit log screen 845 (FIG. 28) details the amount and date that credits have been received by the finance company for the dispute. The disputes credit log screen 845 is the confirmation that the credit has been received from the supplier and posted to the customer's account. The ability to explicitly track credits associated with disputes is a novel feature of the commercial financing payment planner system 10.

In some situations, the customer may disagree with the supplier's resolution to a dispute. In this case, the customer may appeal the dispute resolution through a redispute. The customer selects "redispute" 865 from the disputes screen 595 (FIG. 20). System 10 responds with a "create a redispute" search screen 870 shown in FIG. 29. The customer searches for the dispute it wishes to appeal by entering search criteria in the fields on "create a redispute" search screen 870.

Having selected the dispute for appeal, the customer must either:
  enter a different reason code for the dispute;
  enter a different dispute amount; or
  provide new comments supporting the request for dispute appeal.

System 10 presents to the customer a new dispute screen with a new dispute log number similar to FIG. 25, but including original dispute log number 725 so the supplier can compare the dispute appeal with the original dispute. If the customer provides a new reason code, different dispute amount, or new comments, the supplier will perform additional research into the dispute. Otherwise, the supplier will not approve the dispute appeal. Once the supplier accepts the dispute appeal, the dispute appeal process is identical to the new dispute process.

The finance company negotiates the dispute process with each supplier; the supplier determines under what conditions the customer can submit a dispute, if at all. The supplier must have a profile registered with system 10 before a customer can create a dispute against the supplier.

Figure 30:
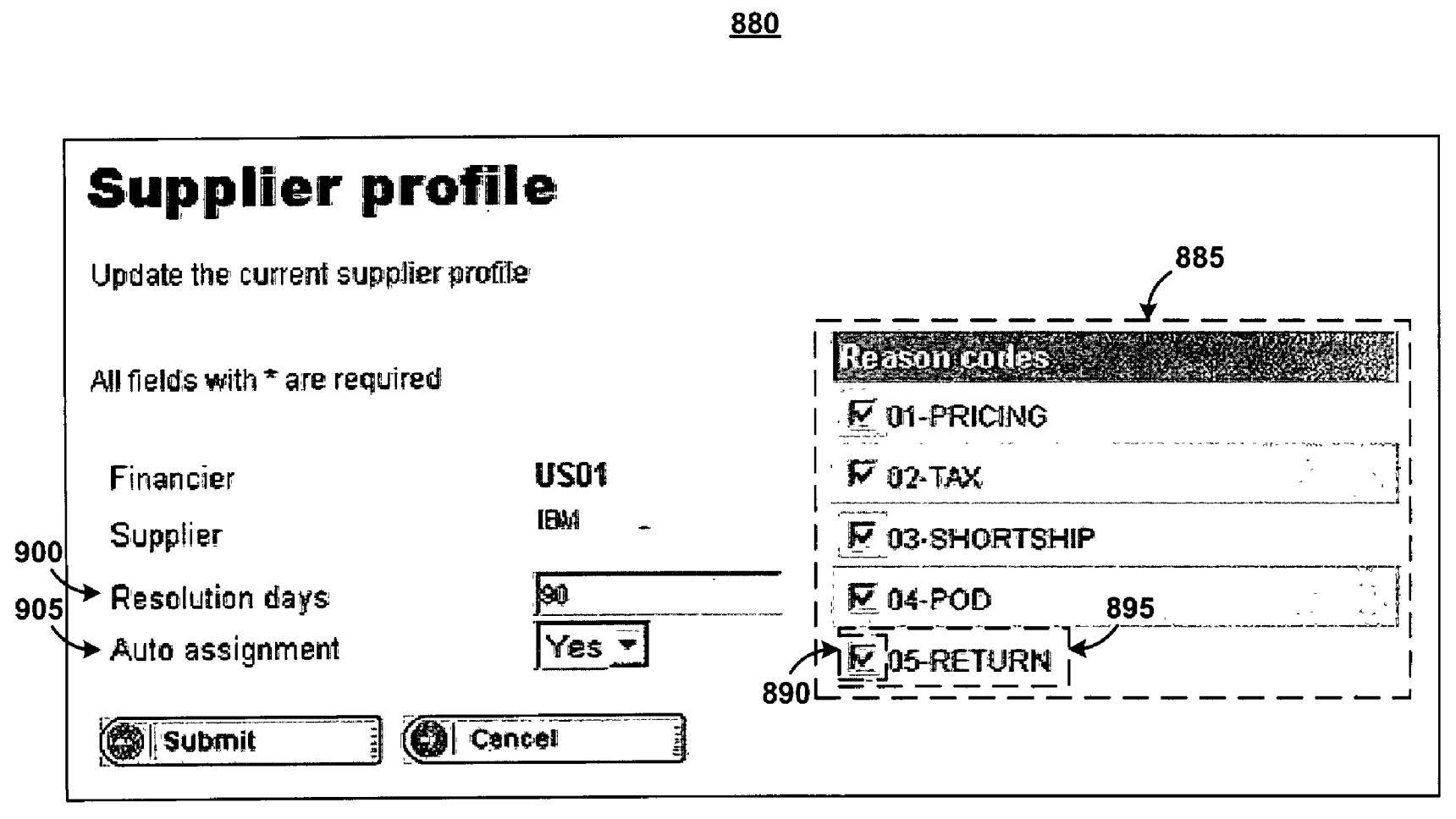

The supplier profile screen 880 shown in FIG. 30, allows the supplier to define the conditions under which a dispute will be accepted. Five possible reason codes 885 are listed for the dispute: pricing, tax, shortship, proof of delivery (POD), and return. Though five reason codes are shown herein for the purpose of illustration, it should clear that other reason codes could also be added, and reason codes could be removed.

The supplier can select the reason or reasons it will accept for disputes by checking the reason code enable button 890. For example, the supplier may not wish to allow returns; in that case, the supplier deselects reason code "05-Return" 895.

Suppliers are not limited to the reason codes 885 listed on the supplier profile screen 880; the list may also be customized by the supplier. Even when the reason codes 885 is customized, the reason code 885 list will be sequentially numbered, and the codes will be consistent for all suppliers. For example, if the reason code "05-Return" 895 is deselected and the supplier adds another reason code, that code will not be "05", but another number provided by system 10. Consequently, the customer, supplier, and finance company will always know what each code represents.

The supplier may set the resolution time frame 900 by selecting the number of days after which disputes can be reversed. As an example, the disputes can be reversed to the supplier by the finance company. Further, the supplier has the option to select dispute auto assignment 905. If selected "yes", the contact specified by the supplier automatically receives disputes from customers, rather that the supplier manually assigning the dispute to a dispute representative.

Figure 32:
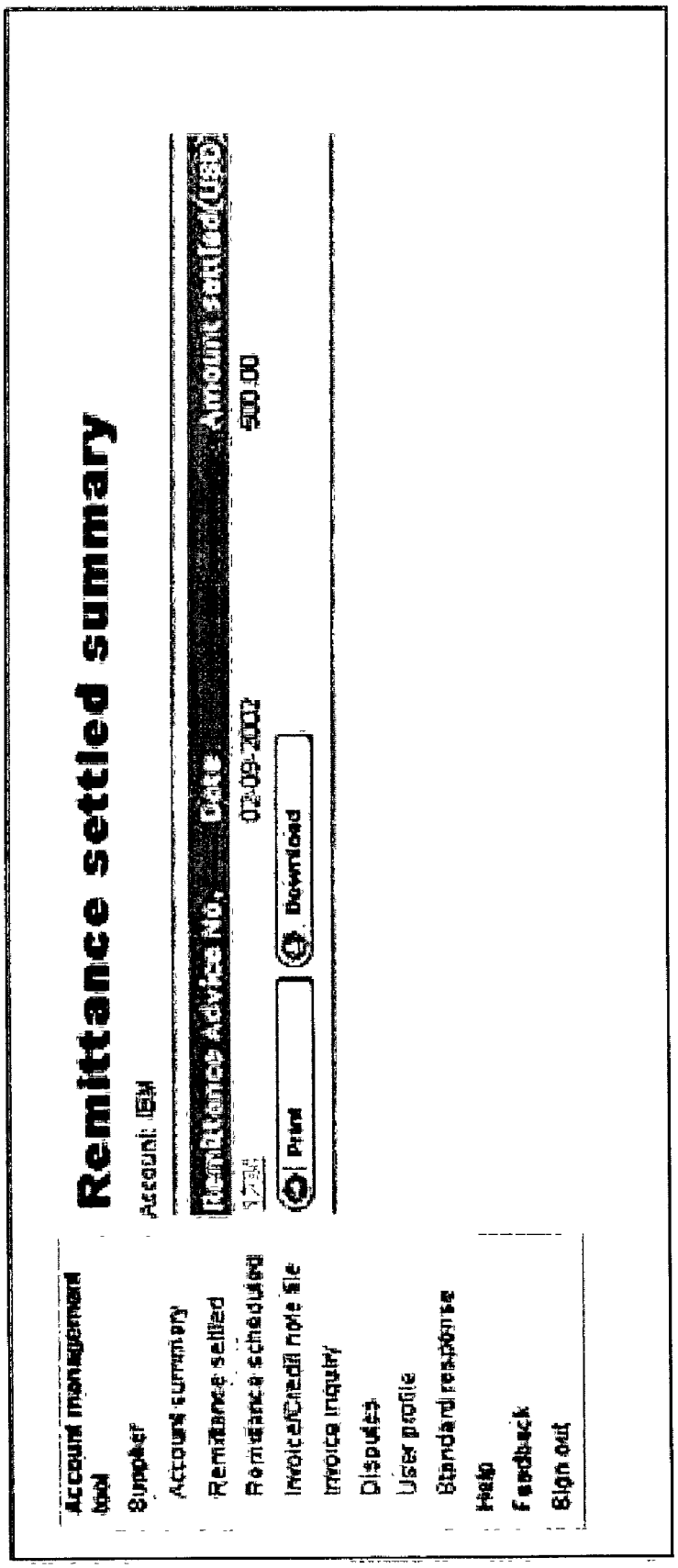
FIG. 32 is a high-level summary screen for payments issued to the supplier.
Figure 33:
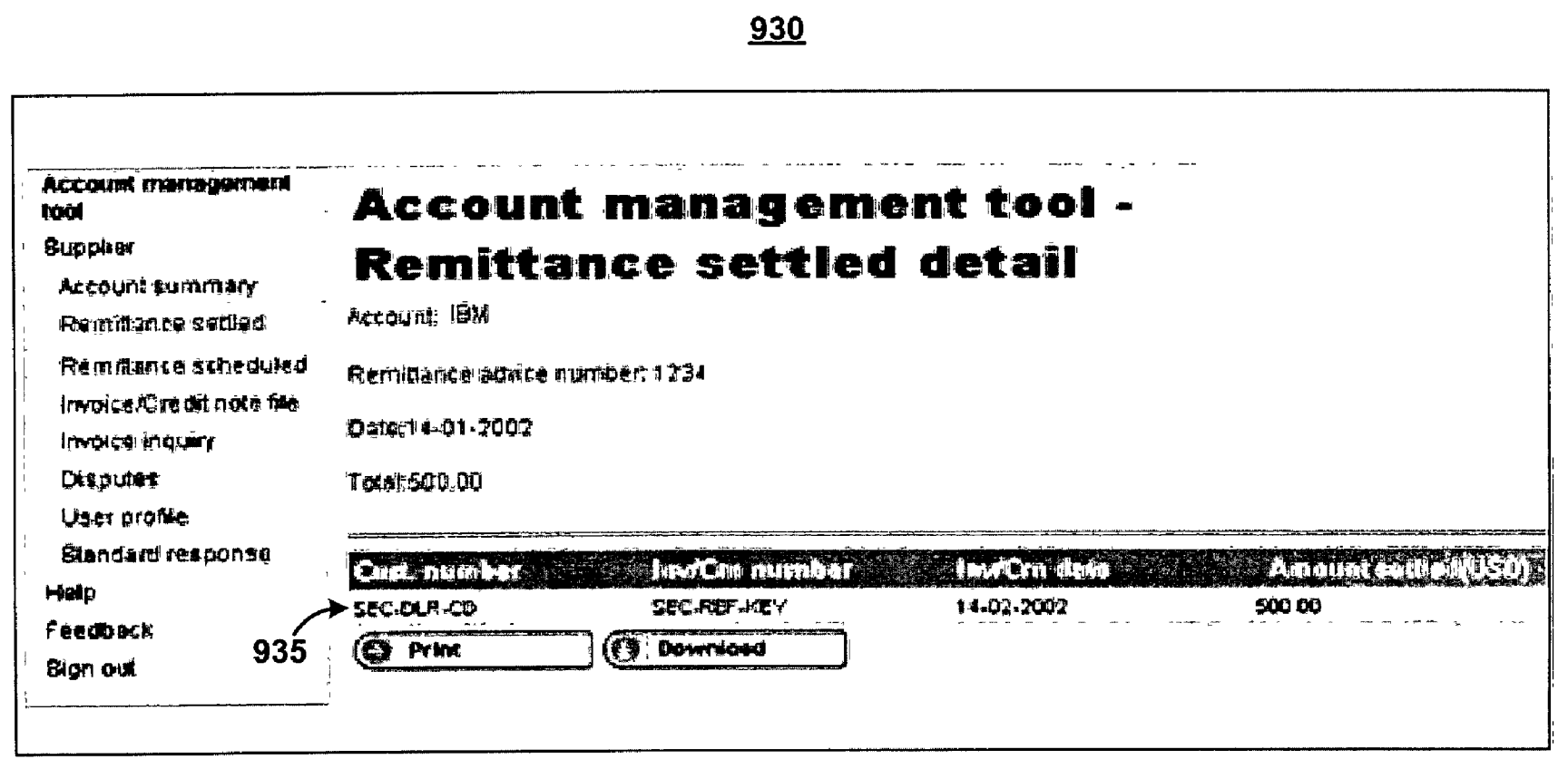

The supplier can monitor its account with the finance company through display screens similar to the customer's account summary. The supplier's account summary 920 is shown in FIG. 31. The finance company receives payments from and issues credits to customers for the purpose of paying suppliers for goods and products shipped to the customer. The supplier can view the status of payments already made by clicking on "remittance settled summary" 915; the "remittance settled summary" screen 920 (FIG. 32) displays a high-level summary of all payments issued to the supplier. Remittances scheduled 925 for payment can be viewed on the remittance scheduled detail screen 930 (FIG. 33). To view a specific scheduled remittance, the supplier clicks on the remittance date 935 to display the remittance scheduled detail screen 940 as seen in FIG. 34.

Figure 35:
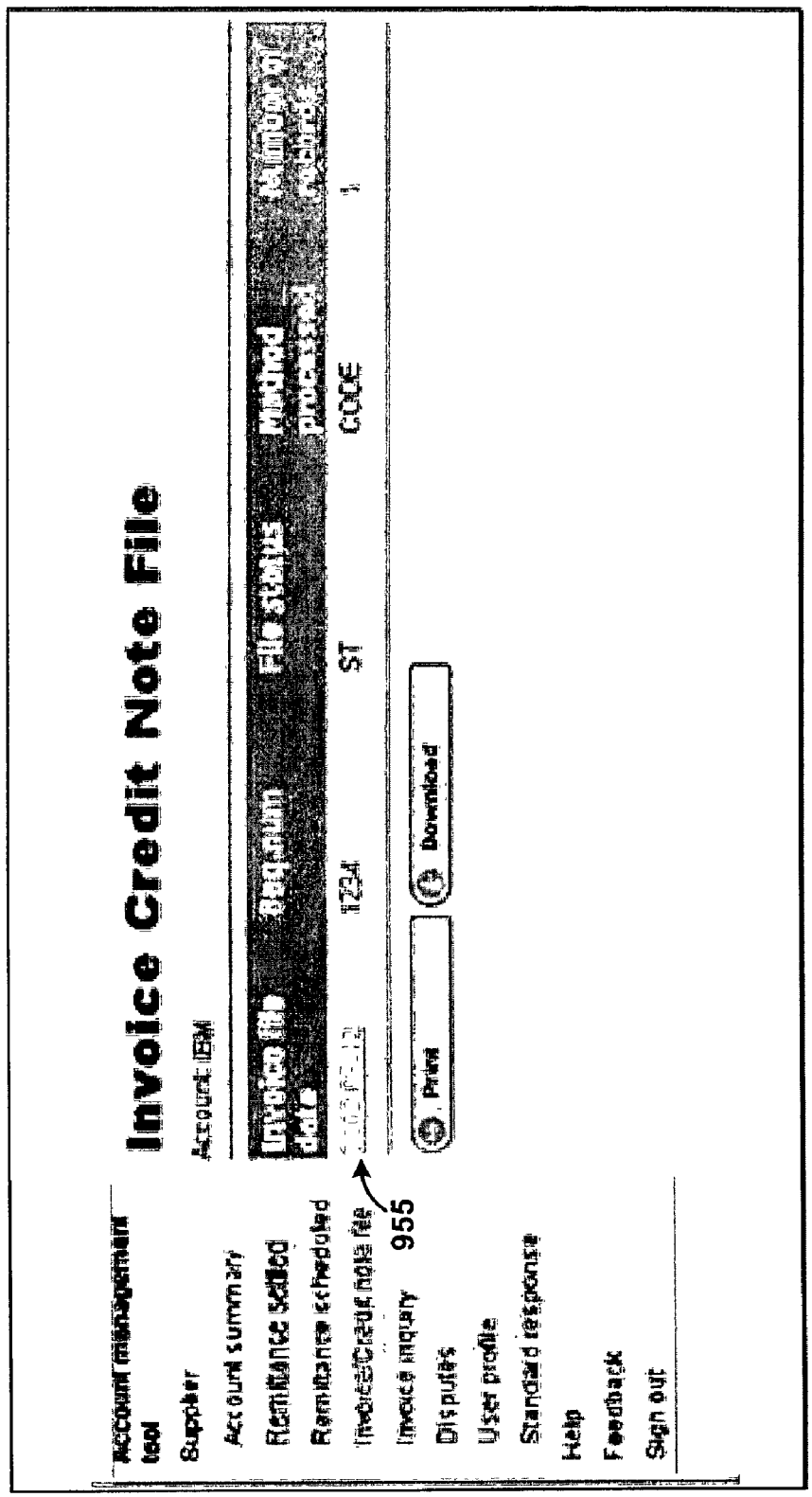
FIG. 35 displays the invoice credit note file screen.

The supplier provides invoice credit note files to the finance company that allow the finance company to set up payments to the supplier. The supplier can view access these files from the supplier account summary screen 910 by clicking on "invoice credit note file" 945 to display the "invoice credit note file" screen 950 (FIG. 35), a high-level summary of all invoice credit notes for that supplier. The supplier can view details on any one invoice credit note file by clicking on the invoice file date 955 to display the "invoice credit note detail" screen 960 of FIG. 36. The supplier can then view the invoice associated with the individual invoice credit note file by clicking on invoice link 965, displaying an invoice such as the one shown in FIG. 8.

Additional supplier support for the dispute process is provided by system 10 through the supplier tracking report 970 of FIG. 37. The supplier tracking report 970 is an aging report that lists all outstanding supplier disputes, the date the dispute was created, and the amount of the dispute. Using the supplier tracking report 970, the supplier can easily see the status of all outstanding invoices and determine which ones need follow-up.

It is to be understood that the specific embodiments of the invention that have been described are merely illustrative of certain application of the principle of the present invention. Numerous modifications may be made to the commercial financing payment planner invention described herein without departing from the spirit and scope of the present invention. Moreover, while the present invention is described for illustration purpose only in relation to the WWW, it should be clear that the invention is applicable as well to a commercial financing system accessible either through an Internet or Intranet connection.

What is claimed is:

1. A method for planning commercial financing payment, comprising:
   accessing an account management tool according to a user's allowed level of access, wherein the user is a customer or a supplier and the account is with a finance company;
   displaying an account summary;
   viewing details for the displayed account, said details comprising:
      an invoice summary comprising supplier invoices;
      a billing invoice summary comprising invoices posted by a finance company, wherein the invoices posted by the finance company comprise interest charges, late fees, returned payments, or returned payment fees;
      returned payments posted by the finance company; or
      unallocated funds available for payments,
   creating a remittance comprising selecting a payment method; and
   submitting the remittance for payment.

2. A method for planning commercial financing payment, comprising:
   accessing an account management tool according to a user's allowed level of access, wherein the user is a customer or a supplier and the account is with a finance company;
   displaying an account summary;
   viewing details for the displayed account;
   creating a remittance comprising selecting a direct debit within a customer's profile; and
   submitting the remittance for payment,
   wherein the automated management tool searches the customer's account for invoices requiring payment and automatically creates a remittance based upon remittance advice previously provided by a customer.

3. A method according to claim 2, wherein the automated management tool transfers funds from the customer's account to a supplier without customer approval for the specific transfer.

4. A method for planning commercial financing payment, comprising:
   accessing an account management tool according to a user's allowed level of access, wherein the user is a customer or a supplier and the account is with a finance company;
   displaying an account summary;
   viewing details for the displayed account;
   creating a remittance comprising selecting a payment method;
   submitting the remittance for payment;
   initiating a dispute regarding an error in a supplier's invoice; and
   suspending interest charges for funds associated with the supplier's invoice until the dispute is resolved.

5. A method for planning commercial financing payment, comprising:
   accessing an account management tool according to a user's allowed level of access, wherein the user is a customer or a supplier and the account is with a finance company;
   displaying an account summary;
   viewing details for the displayed account;
   creating a remittance comprising selecting a payment method; and
   submitting the remittance for payment,
   wherein the user is a supplier and the supplier provides invoice credit notes to a finance company to set up payments to the supplier.

* * * * *